US012602855B2

(12) United States Patent
Graham et al.

(10) Patent No.: US 12,602,855 B2
(45) Date of Patent: Apr. 14, 2026

(54) LIVE MODEL PROMPTING AND REAL-TIME OUTPUT OF PHOTOREAL SYNTHETIC CONTENT

(71) Applicant: Metaphysic Limited, London (GB)

(72) Inventors: Thomas Graham, London (GB); Chris Ume, Bangkok (TH); Jo Plaete, London (GB); Martin Adams, Cheltenham (GB)

(73) Assignee: Metaphysic Limited, London (GB)

( * ) Notice: Subject to any disclaimer, the term of this patent is extended or adjusted under 35 U.S.C. 154(b) by 232 days.

(21) Appl. No.: 18/484,586

(22) Filed: Oct. 11, 2023

(65) Prior Publication Data

US 2024/0346731 A1       Oct. 17, 2024

Related U.S. Application Data

(60) Provisional application No. 63/496,201, filed on Apr. 14, 2023.

(51) Int. Cl.
| | |
|---|---|
| *G06T 13/40* | (2011.01) |
| *G06N 20/00* | (2019.01) |
| *G06T 13/20* | (2011.01) |
| *G06T 19/00* | (2011.01) |
| *G10L 15/26* | (2006.01) |

(52) U.S. Cl.
CPC ............. *G06T 13/40* (2013.01); *G06N 20/00* (2019.01); *G06T 13/205* (2013.01); *G06T 19/006* (2013.01); *G10L 15/26* (2013.01)

(58) Field of Classification Search
CPC ........ G06N 3/044; G06N 3/045; G06N 3/047; G06N 3/08; G06N 20/00; G06T 13/205; G06T 19/006; G06T 13/40; G06T 11/60; G06T 5/60; G10L 15/26; G10L 15/22; G06F 3/167; G06F 3/16; G06V 20/20; G06V 10/82

See application file for complete search history.

(56) References Cited

U.S. PATENT DOCUMENTS

| | | | |
|---|---|---|---|
| 2019/0361719 A1* | 11/2019 | Vangala | .................. G06F 3/167 |
| 2020/0051249 A1 | 2/2020 | Walters et al. | |
| 2020/0134929 A1* | 4/2020 | Krishnamurthy | ....... G06T 19/20 |

(Continued)

OTHER PUBLICATIONS

Search Report and Written Opinion for International Application No. PCT/US24/22674, Dated Aug. 2, 2024, 13 pages.

*Primary Examiner* — Xilin Guo
(74) *Attorney, Agent, or Firm* — Lee & Hayes, P.C.

(57) ABSTRACT

Prompting a trained artificial intelligence (AI) model(s) to output photoreal synthetic content in real-time is described. In some examples, one or more AI models are trained using sequential video frames as training data to obtain one or more trained AI models configured to generate temporally-coherent output data. In an example process, user-provided prompt data representing a prompt provided by a user is received, output data representing synthetic content is generated using the trained AI model(s) based at least in part on the user-provided prompt data, and video content featuring the synthetic content is caused to be displayed on a display based at least in part on the output data. In some examples, the output data is provided to the trained AI model(s) as part of a feedback loop to generate further output data as part of a real-time, iterative prompting system.

21 Claims, 9 Drawing Sheets

(56) References Cited

U.S. PATENT DOCUMENTS

2022/0253676 A1      8/2022  Valstar et al.
2022/0345796 A1*   10/2022  Zhao ................. H04N 21/4415
2024/0282016 A1*   8/2024  Liu ........................ G06Q 50/01

* cited by examiner

400

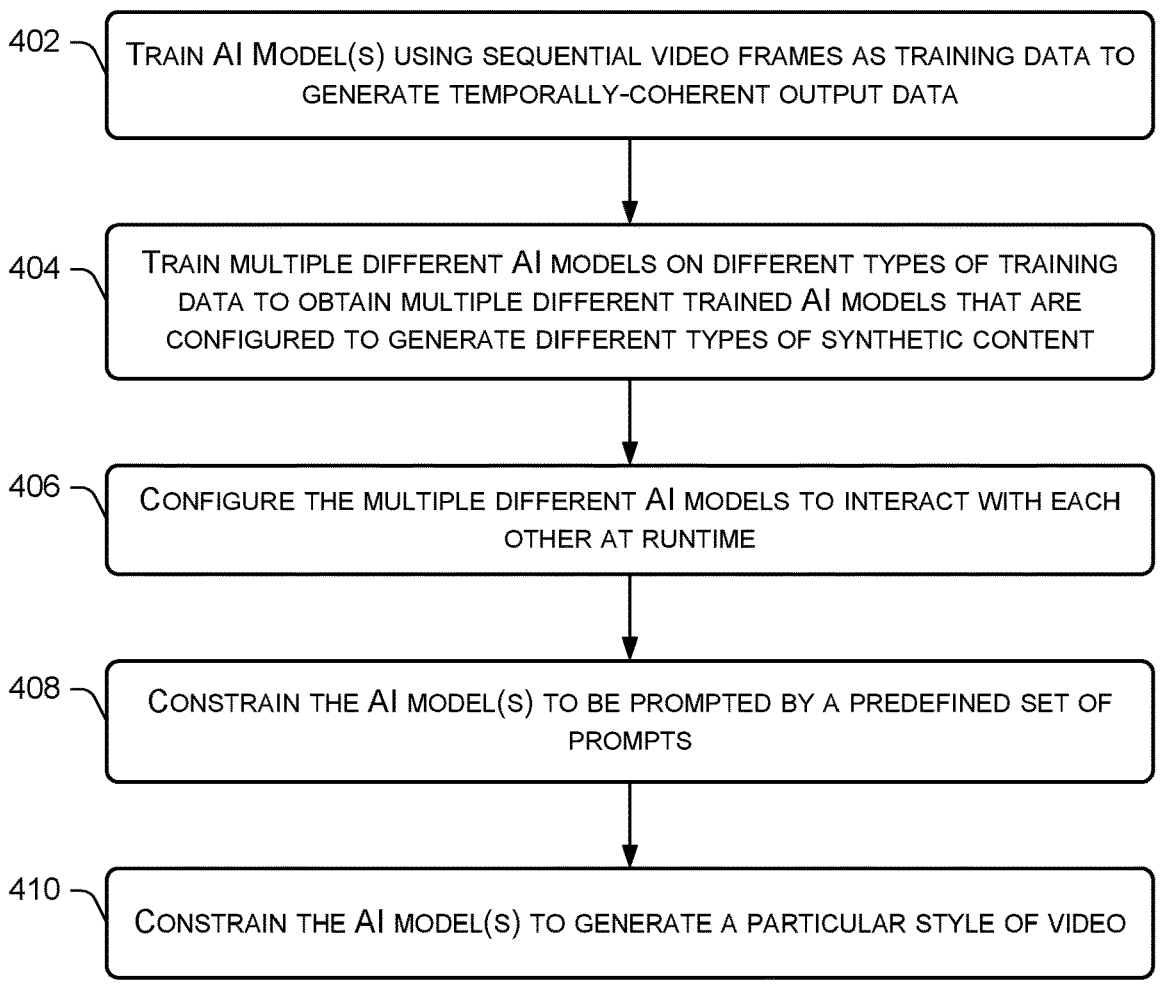

402 — TRAIN AI MODEL(S) USING SEQUENTIAL VIDEO FRAMES AS TRAINING DATA TO GENERATE TEMPORALLY-COHERENT OUTPUT DATA

404 — TRAIN MULTIPLE DIFFERENT AI MODELS ON DIFFERENT TYPES OF TRAINING DATA TO OBTAIN MULTIPLE DIFFERENT TRAINED AI MODELS THAT ARE CONFIGURED TO GENERATE DIFFERENT TYPES OF SYNTHETIC CONTENT

406 — CONFIGURE THE MULTIPLE DIFFERENT AI MODELS TO INTERACT WITH EACH OTHER AT RUNTIME

408 — CONSTRAIN THE AI MODEL(S) TO BE PROMPTED BY A PREDEFINED SET OF PROMPTS

410 — CONSTRAIN THE AI MODEL(S) TO GENERATE A PARTICULAR STYLE OF VIDEO

FIG. 4

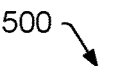

500

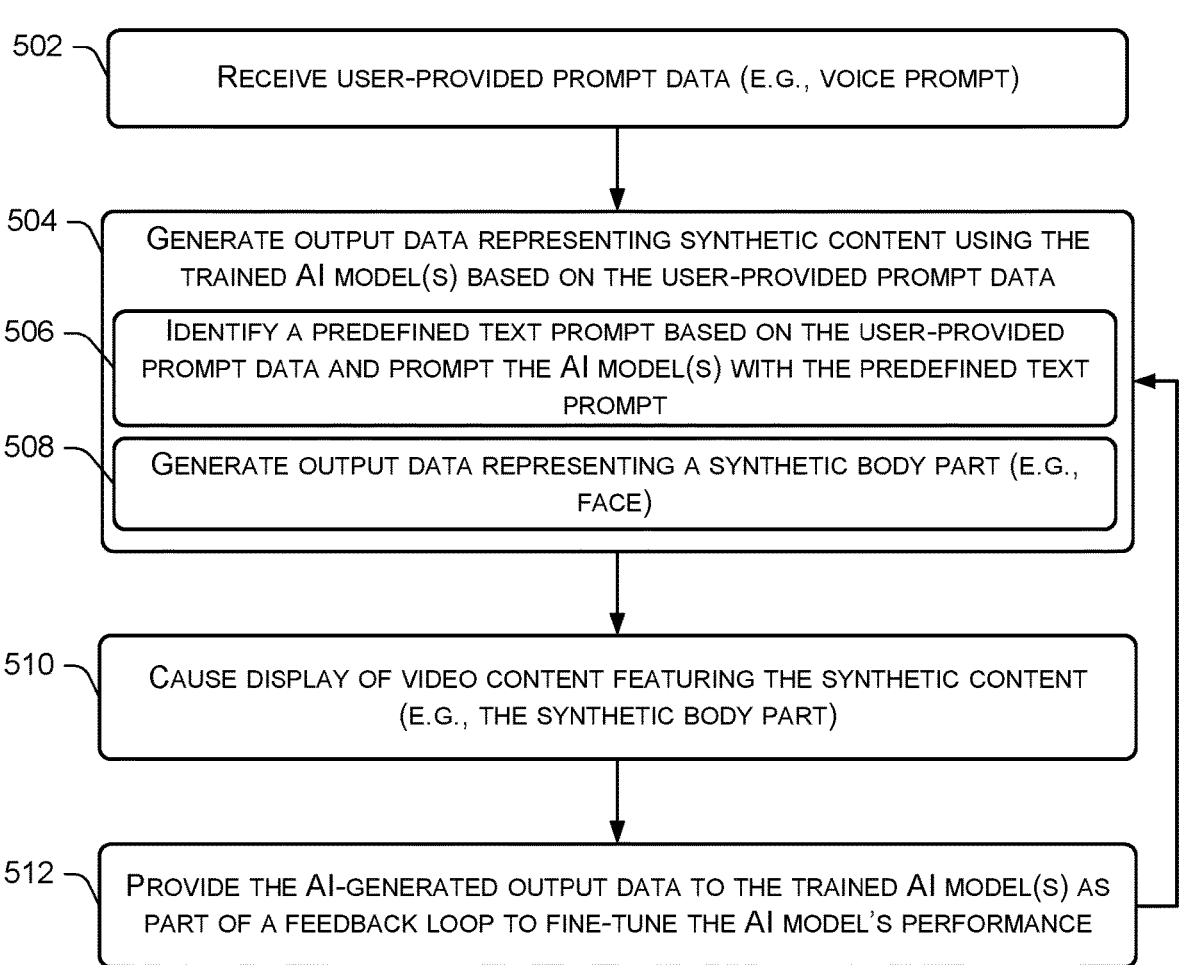

502 — RECEIVE USER-PROVIDED PROMPT DATA (E.G., VOICE PROMPT)

504 — GENERATE OUTPUT DATA REPRESENTING SYNTHETIC CONTENT USING THE TRAINED AI MODEL(S) BASED ON THE USER-PROVIDED PROMPT DATA

506 — IDENTIFY A PREDEFINED TEXT PROMPT BASED ON THE USER-PROVIDED PROMPT DATA AND PROMPT THE AI MODEL(S) WITH THE PREDEFINED TEXT PROMPT

508 — GENERATE OUTPUT DATA REPRESENTING A SYNTHETIC BODY PART (E.G., FACE)

510 — CAUSE DISPLAY OF VIDEO CONTENT FEATURING THE SYNTHETIC CONTENT (E.G., THE SYNTHETIC BODY PART)

512 — PROVIDE THE AI-GENERATED OUTPUT DATA TO THE TRAINED AI MODEL(S) AS PART OF A FEEDBACK LOOP TO FINE-TUNE THE AI MODEL'S PERFORMANCE

FIG. 5

600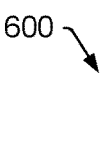

602 — RECEIVE INPUT VIDEO DATA OF A REAL-WORLD SCENE BEING CAPTURED/RECORDED

604 — RECEIVE USER-PROVIDED PROMPT DATA

606 — GENERATE OUTPUT DATA REPRESENTING SYNTHETIC CONTENT USING A TRAINED AI MODEL(S)

608 — PROMPT THE AI MODEL(S) WITH THE PROMPT PROVIDED BY THE USER AND WITH BODY PART DATA REPRESENTING A BODY PART (E.G., FACE) OF A PERSON IN THE REAL-WORLD SCENE

610 — GENERATE A SPARSE SET OF FRAMES

612 — GENERATE OUTPUT VIDEO DATA BASED ON THE INPUT VIDEO DATA AND THE AI-GENERATED OUTPUT DATA

614 — OVERLAY SYNTHETIC BODY PART (E.G., FACE) ON A BODY PART (E.G., FACE) OF THE PERSON IN THE REAL-WORLD SCENE

616 — CAUSE DISPLAY OF VIDEO CONTENT BASED ON THE OUTPUT VIDEO DATA, THE VIDEO CONTENT FEATURING THE SYNTHETIC CONTENT WITHIN THE REAL-WORLD SCENE

FIG. 6

LIVE MODEL PROMPTING AND REAL-TIME OUTPUT OF PHOTOREAL SYNTHETIC CONTENT

CROSS REFERENCE TO RELATED APPLICATION

This application claims priority to Provisional Patent Application Ser. No. 63/496,201, filed Apr. 14, 2023. Application Ser. No. 63/496,201 is fully incorporated herein by reference.

BACKGROUND

Photoreal synthetic content is a key component to the ongoing development of the metaverse. "Synthetic," in this context, means content created using artificial intelligence (AI) tools. For example, generative adversarial networks (GANs) can generate synthetic faces based on training data. Synthetic content is "photoreal" when the synthetic content is so realistic that a human can't tell if it was recorded in real life or created using AI tools.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a flow diagram of an example process for training AI models to generate real-time, temporally-coherent output data representing photoreal synthetic content.

FIG. 5 is a flow diagram of an example process for prompting a trained AI model(s) to output photoreal synthetic content in real-time.

FIG. 6 is a flow diagram of an example process for the real-time output of video content featuring AI-generated, photoreal synthetic content within a real-world scene that is being captured by a video capture device.

DETAILED DESCRIPTION

Figure 1:
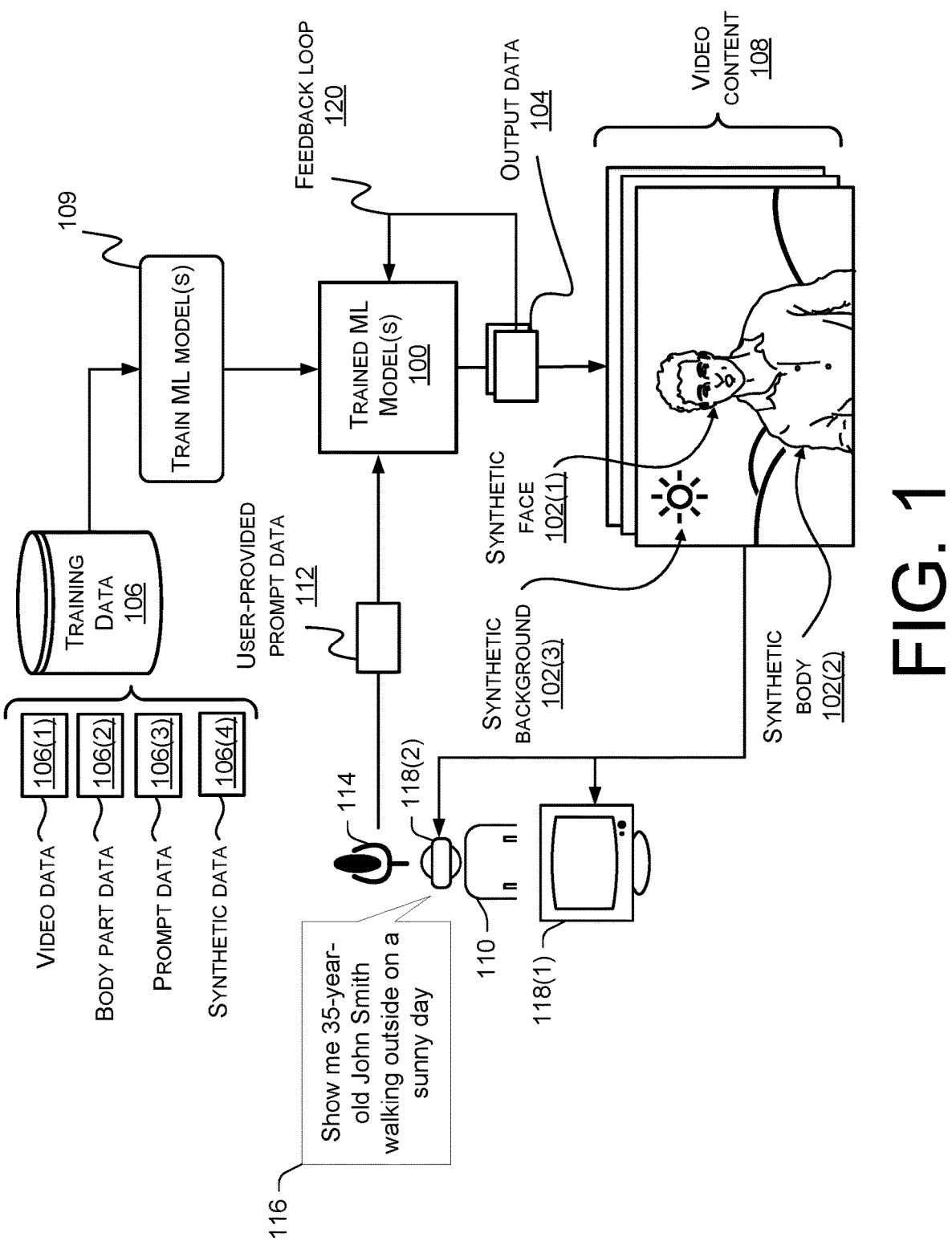
FIG. 1 is a diagram illustrating an example technique for prompting a trained AI model(s) to output photoreal synthetic content in real-time.

Synthetic content is typically generated during a post-production phase of a content creation process, such as a video production process (e.g., filmmaking). For example, special effects, such as computer-generated imagery (CGI), are typically added to a scene of a movie after the scene has already been filmed. A director of the movie may be able to see a live video feed of the scene as the scene is being filmed on a movie set, but this live video feed is devoid of any special effects. Other content creation processes that use AI tools to create synthetic content (e.g., a synthetic face used for face swapping, de-aging an actor, etc.) are typically performed "offline," and the synthetic content created during this offline process can be subsequently uploaded to a content distribution platform for consumption by users of the platform.

Described herein are, among other things, techniques, devices, and systems for prompting a trained AI model(s) to output photoreal synthetic content in real-time. To illustrate, one or more AI models (e.g., machine learning models) may be trained to receive a prompt(s) (e.g., an audio (e.g., voice) prompt, a text prompt, an image prompt, etc.) and to generate output data in response to the received prompt(s), the output data representing synthetic content, which is output (e.g., displayed) in real-time as the output data is generated by the trained AI model(s). In some examples, the AI model(s) may be trained using sequential video frames as training data in order to generate output data that is "temporally-coherent," meaning that the synthetic content looks photoreal to a viewing user when it is output over a series of frames (e.g., synthetic snow appears to be moving across the screen as expected by a viewing user based on the user's real life experience with seeing snow fall). This "tuning" of the AI model(s) through training reduces randomness in the generative output from the model(s), as described in more detail below. The AI model(s) can also be trained with, among other things, prompt data, which allows the trained AI model(s) to generate output data (e.g., image data) based on any suitable type of prompt(s), which, in some examples, may be provided live, by a user.

Once the AI model(s) is/are trained, a user can prompt the AI model(s) by describing (e.g., by speaking and/or typing words using an input device(s)) a subject (e.g., person), an object, a scene, or a combination thereof, and the prompted AI model(s) generates output data representing synthetic content (e.g., imagery), and this synthetic content is output (e.g., displayed) in real-time via an output device (e.g., a display). This "live prompting" guides the trained AI model(s) to generate output data representing synthetic content requested by the user. In some examples, the user who is providing the prompt(s) is also consuming (e.g., viewing, listening to, etc.) the synthetic content as the synthetic content is being output (e.g., displayed) in real-time. For example, a director of a movie may provide live prompts to the trained AI model(s) to cause the model(s) to generate output data representing synthetic content for a scene of the movie, which is displayed in real-time on a display that is being viewed by the director. In some examples, the synthetic content is a synthetic body part (e.g., a synthetic face), in which case the AI model(s) may be trained with a robust dataset of body part (e.g., face) images (e.g., a face (or other body part) captured from a comprehensive set of angles), and this trained AI model(s) may be prompted with body part data (e.g., face data) in order to generate the output data representing the synthetic face (or other body part), which is displayed in real-time. In these examples, an actor, for instance, may be performing a scene that is being captured by a video capture device (e.g., a video camera), and the synthetic face (or other body part) can be overlaid on the face (or other body part) of the actor in real-time on the display, which is being viewed by the director, the actor, and/or others at the location where the scene is being filmed. In an illustrative example, the actor can be de-aged live, while a scene including the actor is being filmed, instead of de-aging the actor during a post-production phase of a filmmaking process. This can create immediate empathy with an AI-modified character in a movie, for example, by allowing a director of the movie, the actor(s) in the movie, and/or others on the movie set to see the AI-modified character on screen, in real-time as a scene of the movie is being filmed, which can, in turn, create a more immersive experience for users on the movie set to improve the quality of directing the movie and/or acting in the movie.

In some examples, the output data generated by the trained AI model(s) is fed back into the AI model(s) as part of a feedback loop, which can be used for fine-tuning the AI model(s) to generate output data that is photoreal, such as by being temporally-coherent. For example, the generative output data resulting from the real-time, iterative prompting of the AI model(s) can be fed back into the AI model(s) in real-time to drive the AI model(s) to generate further output data as part of a real-time, iterative prompting system. In some examples, the AI model(s) is prompted with body part data (e.g., face data) representing a source body part (e.g., a face (or other body part) of an actor performing a scene of a movie that is being captured by a video capture device), and the video footage featuring the source body part (e.g., face) exhibiting movements (e.g., facial expressions) and/or the AI-generated synthetic face (or other body part) exhibiting similar movements (e.g., facial expressions) can be fed back into the AI model(s) in real-time to drive the generative output based at least in part on a human performance. In this manner, the AI model(s) can iteratively learn from the live prompting, from the live video data being captured, and/or from its own generative output in addition to a training dataset of images (e.g., face images, images of other body parts, etc.) used to train/re-train the AI model(s). Accordingly, a real-time, iterative prompting system with a learning feedback loop can be used to fine-tune train the AI model(s) in an ad hoc, real-time sense against the live, iterative input and/or output.

In an example process, one or more machine learning models may be trained using at least sequential video frames as training data to obtain one or more trained machine learning models configured to generate temporally-coherent output data representing synthetic content (e.g., a synthetic face (or other body part), synthetic background content, etc.), and, once trained, the trained machine learning model(s) can be prompted to generate output data representing synthetic content, and the synthetic content can be displayed on a display in real-time. For example, one or more processors may receive user-provided prompt data representing a prompt provided by a user, generate output data representing synthetic content using the trained machine learning model(s) based at least in part on the user-provided prompt data, and cause video content featuring the synthetic content to be displayed on a display based at least in part on the output data generated using the trained machine learning model(s). In some examples, the output data is provided to the trained machine learning model(s) as part of a feedback loop (e.g., to fine-tune the generation of output data that is photoreal (e.g., temporally-coherent)). For instance, a synthetic face representing an actor when they were much younger can be featured in video content that is displayed in real-time in response to a user live-prompting the trained AI model(s) to "show a 20-year-old version of" the actor. As such, a viewing user (e.g., a director on a movie set where an actor is performing a scene for a movie) can view a live video feed of the actor who appears to be 20 years old on screen, when, in fact, the actor is much older in real life, and the synthetic face of the actor is so realistic that the viewing user cannot tell that it was generated using AI tools, thereby making the synthetic content (e.g., the synthetic face) photoreal.

It is to be appreciated that synthetic content (e.g., synthetic faces (or other body parts)) generated using the techniques described herein can be featured in any suitable type of media content, such as image content, video content, audio content, or the like. For example, instances of a synthetic face (or other body part) may be overlaid on a source face (or other body part) of a subject within frames of input video content to generate video data corresponding to video content featuring the synthetic face (or other body part). This is merely an example of a type of media content in which the AI-generated synthetic content can be featured. Regardless of the type of media content, this synthetic content may then be output (e.g., displayed) in real-time in any suitable environment and/or on any suitable output device, such as on a display of a user computing device, in the context of a metaverse environment, or in any other suitable manner.

The techniques and systems described herein can be used in various applications. One example application is filmmaking. For example, a director of a movie might prompt a trained AI model(s) to de-age a famous actor who is performing a scene of the movie on a movie set. In this example, if the actor's name is John Smith, the director can speak into a microphone(s) to prompt the AI model(s) by saying something like "make John look 35 years old," and, in response to this user-provided prompt, a display being viewed by the director can display a live video feed of the real John Smith performing a scene, but with a synthetic face overlaid on John Smith's real face to make the actor look 35 years old, when, in fact, the actor is much older in real life. In some examples, the video content that is displayed in real-time can be generated entirely by the trained AI model(s), in which case, an actor does not need to be present, and a video capture device (e.g., a video camera) does not need to be used to film anything during the creation of the synthetic video content, even though the video content may feature a synthetic subject (e.g., person) that looks like the actor. For instance, a director of a movie might prompt the trained AI model(s) to generate video of the famous actor, John Smith (at any age), walking outside on a sunny day, and the AI model(s) may, in response to this prompt, generate the requested synthetic content without requiring the presence of John Smith at all, because the AI model(s) may have been trained with a robust dataset of images of John Smith to be able to generate a synthetic version of John Smith in the video content being displayed in real-time with the live prompting of the director. Another example application is consumer virtual reality (VR), augmented reality (AR), and/or mixed reality (MR). For example, a user wearing a head-mounted display (HMD) may prompt a trained AI model(s) by speaking into a microphone(s) to generate synthetic content that is displayed in real-time on the HMD. If, for instance, the trained AI model(s) is trained on a dataset of images featuring the user's grandmother when she was much younger, the user could say something like "show me grandma when she was 35 years old," and the AI model(s) can generate output data representing a synthetic version of the user's grandmother at age 35, and this synthetic content can be displayed on the HMD in real-time to provide a "time-warp-like" experience for the user to see their own grandmother in a metaverse-type environment when she was much younger.

The techniques and systems described herein may provide an improved experience for creators and/or consumers of synthetic content, such as users who engage in a content creation process (e.g., filmmaking), participants of the metaverse, or the like. This is at least because, as compared to existing technologies for generating synthetic content during a post-production phase of a content production process and/or during an offline process, the techniques and systems described herein allow for generating synthetic content (e.g., a synthetic face (or other body part)) in real-time, whereby the synthetic content is photoreal by virtue of fine-tuning the AI model(s) that is generating the synthetic content through initially training the AI model(s) on a specific dataset and through subsequently implementing a learning feedback loop where the AI model(s) can iteratively refine the generative output it is providing in response to prompts. Accordingly, the techniques and system described herein provide an improvement to computer-related technology. That is, technology for generating synthetic content using AI tools is improved by the techniques and systems described herein at least by virtue of generating synthetic content (e.g., synthetic faces, other synthetic body parts, synthetic background content, etc.) of higher quality (e.g., synthetic content that is more realistic), as compared to the synthetic content generated with existing technologies, and doing so in real-time to provide unique use case scenarios that are not presently achievable with the existing offline production of synthetic content.

In addition, the techniques and systems described herein may further allow one or more devices to conserve resources with respect to processing resources, memory resources, networking resources, etc., in the various ways described herein. For example, in an implementation where a video capture device (e.g., a video camera) is being used to capture a real-world scene, such as an actor performing a scene of a movie, and the generative output data is combined with the video data generated by the video capture device to generate the video content that is ultimately rendered in real-time on a display, the AI model(s) may generate output data for a sparse set of frames (e.g., a subset, but not all, of the series of frames that constitute the video data corresponding to the video content). This conserves processing resources that are utilized for the AI model(s) to generate the output data without compromising the quality of the video content. For example, a viewing user may be unable to notice that the synthetic content is not generated for every frame of the rendered video content due to the relatively high frame rate at which the video content is rendered. As another example, the AI model(s) can be constrained to a predefined set of prompts, such as prompts that are common, popular, and/or otherwise likely to be used to prompt the AI model(s), as opposed to allowing any and all prompts to trigger generative output from the AI model(s), which conserves computing resources used for training and/or running the AI model(s). These and other technical benefits are described in further detail below with reference to the figures.

Although many of the examples described herein pertain to generating synthetic faces of people, the techniques, device, and systems described herein can be implemented to generate any synthetic content including any suitable body part (e.g., body parts other than a face, such as a neck, an arm, a hand, a leg, a foot, etc.), objects (e.g., trees, buildings, vehicles, etc.), and/or scenery and other background elements (e.g., sky, mountains, grass, a room, snow, rain, etc.). In this sense, the techniques, devices, and systems described herein may be implemented to create media content featuring any kind of synthetic content. Additionally, or alternatively, the techniques, devices, and systems described herein can be implemented to generate synthetic faces (or other body parts) of any suitable type of subject besides a person/human, such as an animal (e.g., a monkey, a gorilla, etc.), an anthropomorphic robot, an avatar, other digital characters, and the like. It is also to be appreciated that, although many of the examples described herein pertain to generating synthetic imagery (or content that is visual and can be seen with the eyes), the techniques and systems described herein may be implemented to generate synthetic audio content (e.g., a synthetic song in the style of a famous artist) based on a live prompt (e.g., from a user).

FIG. 1 is a diagram illustrating an example technique for prompting a trained AI model(s) (e.g., a trained machine learning (ML) model(s) 100) to output photoreal synthetic content 102 in real-time. FIG. 1 depicts one or more trained machine learning models 100 (sometimes referred to herein as an "AI model(s)") that are trained to generate output data 104, which represents, or is otherwise used to create, photoreal synthetic content 102. FIG. 1 illustrates examples of the synthetic content 102 including a photoreal synthetic face 102(1) of a person, a photoreal synthetic body part (e.g., synthetic body 102(2)) of the person, and a photoreal synthetic background 102(3) (e.g., a synthetic sun, synthetic sky, a synthetic landscape, such as hills, etc.).

Machine learning generally involves processing a set of examples (called "training data" 106 or a "training dataset" 106) in order to train a machine learning model(s) 100. A machine learning model(s) 100, once trained, is a learned mechanism that can receive new data as input and estimate or predict a result as output. In particular, the trained machine learning model(s) 100 used herein may be configured to generate synthetic content 102, such as synthetic video content, synthetic image content, and/or synthetic audio content. In some examples, the synthetic content 102 (e.g., the synthetic face 102(1), the synthetic body 102(2), the synthetic background 102(3), etc.) can be featured in media content, such as video content 108, wherein the video content 108 includes a mixture of the synthetic content 102 and "real" content corresponding to a real-world scene captured by an image/video capture device. In some examples, a trained machine learning model(s) 100 used to generate the synthetic content 102 (e.g., the synthetic face 102(1), the synthetic body 102(2), the synthetic background 102(3), etc.) may be a neural network(s). In some examples, a latent diffusion model (LDM) (e.g., Stable Diffusion) is used herein as a trained machine learning model(s) 100 for generating synthetic content 102. In other examples, the trained machine learning model(s) described herein can be any suitable type(s) of machine learning model(s), such as a diffusion model, an autoencoder(s), a generative model(s), such as a generative adversarial network (GAN), a three-dimensional (3D) model generator, a neural radiance field (NeRF), a large language model (LLM), or the like. In some examples, the trained machine learning models described herein represents a single model or an ensemble of base-level machine learning models. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble. In some examples, the machine learning model(s) 100 represent multiple different models 100 that are configured to be utilized together to generate the synthetic content 102. For example, pairs of the multiple different models 100 may be synchronized and/or configured to interact with each other to generate their respective outputs, and the individual models 100 may be trained to perform specific tasks (e.g., specialized models 100 configured to generate output data 104 representing specific types of synthetic content 102 and/or specific styles of content (e.g., imagery, audio, etc.)).

A training dataset 106 that is used to train the machine learning models described herein may include various types of data. In general, training data 106 for machine learning can include two components: features and labels. However, the training dataset 106 used to train the machine learning models described herein may be unlabeled, in some embodiments. Accordingly, the machine learning models described herein may be trainable using any suitable learning technique, such as supervised learning, unsupervised learning, semi-supervised learning, reinforcement learning, and so on. The features of the training data 106 can be represented by a set of features, such as in the form of an n-dimensional feature vector of quantifiable information about an attribute of the training data 106. As part of the training process, weights may be set for machine learning. These weights may apply to a set of features included in the training dataset 106. In some examples, the weights that are set during the training process may apply to parameters that are internal to the machine learning models (e.g., weights for neurons in a hidden-layer of a neural network). The weights can indicate the influence that any given feature or parameter has on the output of the trained machine learning models.

In order to improve the quality of the output data 104 generated by the trained machine learning model(s) 100, the machine learning model(s) 100 may be trained (block 109 in FIG. 1) based on training data 106 that includes, at least in part, sequential video frames of video data 106(1). In this manner, the machine learning model(s) 100 can be trained to generate output data 104 representing synthetic content 102 (e.g., a synthetic face 102(1), a synthetic body 102(2), a synthetic background 102(3), etc.) that is "temporally-coherent." meaning that the synthetic content looks photoreal to a viewing user when it is output over a series of frames for rendering the video content 108. This "tuning" of the machine learning model(s) 100 through training at block 109 reduces randomness in the generative output from the model(s) 100. In other words, the machine learning model(s) 100 learns, during the training at block 109, how to generate a sequence of images that are temporally-coherent in that the synthetic content 102 featured in the sequence of images is coherent over time (e.g., over a series of rendered frames of the video content 108). To illustrate, the machine learning model(s) 100 may be trained, at block 109, using footage (e.g., sequential video frames) of snow falling. By training the model(s) 100 with footage of snow falling, the model(s) 100 learns how to generate output data 104 representing synthetic snow in a temporally-coherent manner. For example, if the model(s) 100 is trained to generate synthetic snow over a series of frames of the video content 108, then the video content 108 that is output frame-by-frame on a display will feature synthetic snow that appears to be moving across the screen as expected by a viewing user based on the user's real life experiences of seeing snow fall, as opposed to synthetic snow that looks glitchy frame-to-frame, as if a physics simulation were running with parameters (e.g., gravity, wind, etc.) that vary randomly frame-to-frame.

In some examples, the training data 106 includes body part data 106(2) (e.g., face data) to allow the trained machine learning model(s) 100 to generate output data 104 representing a synthetic face 102(1) and/or a synthetic body 102(2). For example, the body part data 106(2) may represent a large data set of faces (e.g., face image data) and/or a large data set of other body parts captured from a comprehensive set of angles. For example, the body part data 106(2) may include images of a face (or other body part) captured head on, from the left side, from the right side, from the top, from the bottom, and/or any intermediate angles therebetween. In some examples, angle data corresponding to the angles from which the face(s) (or other body part(s)) was captured is stored as metadata and associated with the face images. To illustrate, the body part data 106(2) may include a large data set of images (e.g., hundreds of images, thousands of images, hundreds of thousands of images, etc.) of a famous actor (e.g., face images of the actor's face). In some examples, the face images feature the famous actor at various ages ranging from young (e.g., ~16 years old) to old (e.g., ~70 years old), which can allow for de-aging the actor through swapping the actor's face with their own face when they were younger. In some examples, the body part data 106(2) includes face images of multiple different subjects (e.g., people) to allow for generating synthetic faces 102(1) of the different subjects (e.g., people) and/or for swapping faces on-demand, when the model(s) 100 is prompted to do so. In some examples, the trained machine learning model(s) 100 is trained to generate output data 104 representing a synthetic face 102(1) of a particular subject (e.g., a model 100 that specializes in generating a synthetic face 102(1) of a particular subject from any angle). In this manner, there can be multiple different trained machine learning model(s) 100, each model(s) 100 being trained on a specific face of a specific subject (e.g., person). In some examples, the trained machine learning model(s) 100 can be trained at block 109 to swap a face that is featured in input video data with an AI-generated, synthetic face 102(1), such as by overlaying the synthetic face 102(1) on the face captured by a video capture device. In other words, the machine learning model(s) 100 may learn to swap a face featured in input video data with a photoreal synthetic face 102(1) of a subject (e.g., a person), as described in more detail below. In some examples, the trained machine learning model(s) 100 can be trained at block 109 to change an angle of the face based on prompts from a user 110.

In general, the trained machine learning model(s) 100 can be prompted to generate the output data 104 using any suitable prompt data. In some examples, a user 110 can prompt the trained machine learning model(s) 100 by describing a person, an object, a scene, or a combination thereof, and the prompted model(s) 100 generates output data 104 representing synthetic content 102 (e.g., imagery) based on user-provided prompt data 112. This synthetic content 102 is also output (e.g., displayed) via an output device (e.g., a display) in real-time as the output data 104 is generated by the model(s) 100. The user 110 can interact with and/or use any suitable type of input device to prompt the trained machine learning model(s) 100, such as a keyboard, a mouse, a touchpad, a touch screen, an electronic stylus, a handheld controller, a microphone, a brainwave input device (e.g., an electroencephalography (EEG) head-worn device, a microchip implanted in the brain, graphene-based sensors attached to the head of the user 110, etc.), or other type of input device. FIG. 1 depicts the user 110 speaking into a microphone(s) 114 as an exemplary input device in order to prompt the trained machine learning model(s) 100, but the user 110 may additionally, or alternatively, type words using a keyboard, for example, to prompt the model(s) 100, or the user 110 may use any other suitable input device, as described above and/or known to a person having ordinary skill in the art. The "live prompting" provided by the user 110 guides the trained machine learning model(s) 100 to generate output data 104 representing synthetic content 102 that is requested by the user 110. In the example of FIG. 1, the user 110 prompts the model(s) 100 with a voice prompt 116 by saying "Show me 35-year-old John Smith walking outside on a sunny day." and the model(s) 100 generates output data 104 corresponding to the requested synthetic content 102 that is output (e.g., displayed) in real-time. Any suitable speech-to-text technology can be used to convert audio data generated by the microphone(s) 114 into text data representing a voice prompt, such as the voice prompt 116 of FIG. 1. For example, a processor(s) may utilize an automatic speech recognition (ASR) component and/or natural language understanding (NLU) component to generate text data based on user speech. Thus, in some examples, the user-provided prompt data 112 may represent text data, although it is to be appreciated that the user-provided prompt data 112 may additionally, or alternatively, include audio data, image data, or any suitable type of data.

In order to train the model(s) 100 to map input prompts to output data 104 (e.g., output image data), the machine learning model(s) can be trained with prompt data 106(3). In some examples, a prompt can be anything that triggers the model(s) 100 to generate output data 104, such as an audio (e.g., voice) prompt, a text prompt, an image prompt (e.g., face data, such as face image data), a brainwave prompt, or a combination thereof. As such, the prompt data 106(3) can represent any one or more of these types of prompts or other types of prompts, and the user-provided prompt data 112 can represent any one or more of these types of prompts or other types of prompts. For example, the user 110 may wear (or have implanted) a brain-computer interface device to allow the trained machine learning model(s) 100 to receive user-provided prompt data 112 that represents brainwaves (or brain signals, brain activity, etc.) of the user 110, in which case the user 110 would not be required to verbally prompt the model(s) 100 or type words via a keyboard to prompt the model(s) 110; instead, the user 110 can merely think about what they would like to have displayed on a display device 118 and/or what they would like to hear via a speaker(s), and the model(s) 100 can be used to generate synthetic content 102 corresponding to what the user 110 is thinking.

In some examples, in order to improve the quality of the output data 104, and/or to tailor the output data 104, and/or to conserve computing resources, and/or to help achieve real-time output of synthetic content 102 (e.g., on a display), the model(s) 100 can be constrained in one or more ways. Constraining the model(s) 100, as described herein, can allow the model(s) 100 to perform better and/or faster in a reduced subspace (e.g., by setting a boundary within which the model(s) 100 is permitted to operate so that the model(s) 100 exclusively generates output data 104 within that prescribed boundary). In these examples, the training data 106 may include a sample dataset that is within the prescribed boundary. In one example, the machine learning model(s) 100 can be constrained to a predefined set of prompts, such as prompts that are common, popular, and/or otherwise likely to be used to prompt the model(s) 100. In some examples, the predefined set of prompts can be updated periodically as new prompts are discovered or to delete or otherwise modify existing ones of the predefined set of prompts. In some examples, the model(s) 100 can be constrained by the prompt data 106(3) including the predefined set of prompts, as opposed to allowing any and all prompts to trigger generative output from the model(s) 100. Additionally, or alternatively, the model(s) 100 can be constrained by a front-end filter that filters incoming prompts against a list of the predefined set of prompts, and if the incoming prompt is not on the list, a processor(s) may refrain from running the model(s) 100, which can conserve computing resources used for running the machine learning model(s) 100 at runtime. Training the model(s) 100 at block 109 on a predefined set of prompts can also conserve computing resources used for training. This technique of constraining the model(s) 100 can also help achieve real-time output of the synthetic content 102 by reducing the latency between the input prompt and the generation of the output data 104. Other example ways of constraining the model(s) 100 are described in more detail below.

In some examples, the training data 106 is ample. For instance, as described above, the body part data 106(2) may include a large data set of images (e.g., hundreds of images, thousands of images, hundreds of thousands of images, etc.) of a subject, such as a famous actor. In some examples, however, the training data 106 pertaining to a particular subject may be sparse. This may be because the time available to capture data pertaining to the subject is short, and/or because the subject does not want to be burdened with capturing such data. In these scenarios, the only data pertaining to the subject that is available may be image data representing a single image, a few images, a short video, or a basic image scan of the subject (e.g., the subject's face). In some examples, a subject may wish to have a trained machine learning model(s) 100 synthesize himself/herself, but the subject may only have limited time and/or a limited ability to capture data pertaining to their face or another body part(s). For example, the subject may possess a smart phone and may wish to have the model(s) 100 generate a synthetic version of their face using just a single picture (or a few pictures, or a short video) of their face captured with the smart phone's camera(s). Accordingly, the techniques, devices, and systems described herein may be configured to efficiently capture, receive, and/or utilize a limited amount of data pertaining to a subject, and to generate output data 104 that represents synthetic content 102 (e.g., a synthetic face 102(1) and/or a synthetic body 102(2)) pertaining to the subject based at least in part on the limited amount of data pertaining to the subject, and without requiring the subject to provide any additional data. This can improve the user experience in that it is very convenient for a subject to be able to synthesize himself/herself by simply taking a picture, a few pictures, a short video, or a basic scan of their face or another body part(s).

To illustrate, the user 110 of FIG. 1 may wish to feature a synthetic version of himself/herself in a movie starring a famous actor. Moreover, the user 110 may wish to do this without actually being filmed as an actor in the movie. In this example use case, the user 110 may capture an image(s) of their face using a camera(s) of an electronic device, such as a smart phone, a tablet computer, or the like. In some examples, the user 110 may capture multiple images of their face, such as multiple images of their face from different angles, and/or multiple images of their face exhibiting different facial expressions (e.g., smiling, not smiling, frowning, crying, surprised, afraid, eyes closed, eyes open, etc.). In some examples, the user 110 can capture a video of himself/herself (e.g., his/her face), potentially while moving the camera(s) around a space to capture video of himself/herself from different angles, distances, etc., and/or while making different facial expressions, body poses, or the like. In these examples, there may not be any other data regarding the user 110 that is available to use for synthesizing the user 110.

In this running example, at block 109 of FIG. 1, the machine learning model(s) 100 may be trained using sparse data pertaining to the subject (e.g., the user 110 in FIG. 1) as training data 106. For example, the video data 106(1) used for training the machine learning model(s) 110 may include the short video of the user 110 (e.g., the user's 110 face) mentioned above. As another example, the body part data 106(2) may include the above-mentioned images of the user 110, such as one or more face images captured by the user 110 using a camera(s) of an electronic device in their possession. In this example, the machine learning model(s) 100 can be tuned to the likeness of the subject (in this case, the user 110) at block 109 based at least in part on the sparse data available as training data 106 because the sparse training data 106 pertaining to the subject may be a sufficient amount of data to determine how the subject's facial muscles move when the subject makes different facial expressions (e.g., smiling, frowning, etc.) that are exhibited in the sparse data.

In other examples, the subject may not capture a sufficient amount of data to make these determinations. For example, the sparse data pertaining to the subject (e.g., the user 110) may include images and/or videos of the subject's face with certain facial expressions, from certain angles, and in certain lighting conditions, but may be lacking images and/or videos of the subject's face with other facial expressions, from other angles, and/or in other lighting conditions that may be desired for training the machine learning models described herein. Accordingly, in some examples, the training dataset 106 can be augmented with synthetic data 106(4) in order to obtain a more complete training dataset 106, which can then be used to train the machine learning models described herein (e.g., at block 109). In some examples, the synthetic data 106(4) is created (or generated) using an AI model(s), such as a diffusion model(s) (e.g., a tuned diffusion model(s) that is configured to generate photoreal synthetic content, such as synthetic faces). In some examples, the AI model(s) that is used to generate the synthetic data 106(4) (sometimes referred to herein as "AI-generated synthetic data 106(4)") utilizes at least some of the sparse data pertaining to the subject (e.g., the user 110), such as a set of one or more images and/or videos of a face of the subject, to generate the synthetic data 106(4) (e.g., AI-generated images and/or videos of a face with facial expressions, from angles, and/or in lighting conditions that were missing from the initial training dataset 106). In this manner, the training dataset 106 that is augmented with the synthetic data 106(4) includes a more complete dataset (e.g., a more robust set of images of a face(s), such as face images where the face(s) has a rich set of facial expressions, is shown from a rich set of angles, and/or is featured in a rich set of lighting conditions). Thus, the synthetic data 106(4) can be added to the initial training dataset 106 in order to "fill holes (or gaps)" in the initial training dataset 106. A training dataset 106 with a more abundant set of images to train from can allow for training the machine learning models described herein more efficiently by reducing the number of iterations that the machine learning models are retrained in order to fine tune the model(s). Furthermore, the output (e.g., the synthetic face 102(1)) generated by the trained machine learning model(s) 100 can be higher-quality output (e.g., a synthetic face 102(1) that is photoreal) due to being trained on a more robust set of training data 106 (e.g., images of faces from angles that were originally missing from the initial training dataset 106 but are now included in the training dataset 106 that is augmented with the synthetic data 106(4)).

In some examples, a processor(s) may analyze (e.g., scan) the initial training dataset 106 (e.g., based at least in part on the captured data pertaining to the subject, such as a single face image of the subject) to identify missing data pertaining to the subject. For example, the subject (e.g., the user 110) may capture just a single image, or a few images, of their face, and upon analyzing this sparse data, the processor(s) may determine that the sparse data does not include any images of the subject's face captured from a particular set of angles. The processor(s) can then use an AI model(s) (e.g., a tuned diffusion model(s)) and the sparse set of one or more face images of the subject to generate synthetic data 106(4). This AI-generated synthetic data 106(4) can include AI-generated images of a synthetic version(s) of the subject's face from the missing set of angles. In another example, the AI-generated synthetic data 106(4) can include AI-generated images of a synthetic version(s) of the s subject's face with missing facial expressions, in missing lighting conditions, or the like. In some examples, the synthetic data 106(1) may include AI-generated images of a de-aged (or aged) subject, such as a synthetic version(s) of a younger or older face of the subject (e.g., the user 110). The processor(s) can then add the synthetic data 106(4) to the initial training dataset 106 in order to obtain an augmented training dataset 106 that includes the synthetic data 16(4), and the augmented training dataset 106 with the synthetic data 106(4) can be used to train the machine learning model(s) 100, with the objective of training the machine learning model(s) 100 with a more robust training dataset 106 that fills the holes (or gaps) found in the initial data that the subject captured of himself/herself.

In some examples, footage of a stand-in actor can be captured while the actor is exhibiting a variety of desired facial expressions, and the footage can be captured from a variety of angles. Meanwhile, an AI model(s) (e.g., a tuned diffusion model(s)) can be used to generate a synthetic version of the subject's (e.g., the user's 110) face using the sparse data (e.g., a single face image, a few face images, etc.) that the subject (e.g., the user 110) captured using a camera(s) of an electronic device, and this synthetic face of the subject (e.g., the user 110) can be overlaid on the face of the stand-in actor featured in the captured footage. For example, the synthetic face of the subject can be generated by a tuned diffusion model(s) to mirror the facial expressions of the stand-in actor, from the angles at which the stand-in actor was filmed in the original footage. Accordingly, video data can be generated of a synthetic version of the subject (e.g., the user 110) doing things (e.g., making facial expressions, body movements, etc.) that the stand-in actor did in the original footage, all without requiring the subject to do those things. This synthetic video data can then be used as synthetic data 106(4) to train the machine learning model(s) 100 at block 109 of FIG. 1.

In these examples above, where the machine learning model(s) 100 is trained using sparse data pertaining to the subject (e.g., the user 110), the subject's identity can be "tuned" into the model(s) 100 as a synthetic representation of the subject (e.g., the user 110). In some examples, this creates a latent space mapping by projecting the subject's identity (e.g., face) into the latent space of the model(s) 100.

Thus, the trained model(s) 100 retains the subject's data as a form of digital "DNA", or a digital identity of the subject (e.g., the user 110). In some examples, the latent space mapping mentioned above represents, or includes, a mapping from input data (e.g., an input image(s), video, etc.) pertaining to the subject to a string of values (e.g., numbers) representing a point(s) in the latent space of the trained model(s) 100.

Once the model(s) 100 is tuned to the likeness of the subject (e.g., the user 110), as described above, the user 110, or another person, can prompt the model(s) 100 (e.g., with a voice prompt 116) to generate output data 104 that corresponds to synthetic content 102 requested in the prompt. For instance, the user 110 can prompt the model(s) 100 to feature the user 110 in a movie starring a famous actor(s), and the model(s) 100 can, based on this prompt, generate output data 104 that corresponds to synthetic content 102 featuring the user's 110 face (e.g., the user's 110 face may be overlaid on a character's face in the movie), which can make it appear as though the user 110 acted in the movie with the famous actor(s) (e.g., as a supporting actor), even though the user 110 was not at the movie set during the filming of the movie. In some examples, the output data 104 is generated by locating, within the latent space of the trained machine learning model(s) 100, a latent space point(s) (or coordinate(s)) that corresponds to a requested image(s) of the subject. This allows for synthesizing the subject (e.g., the user 110) in various different contexts, by generating novel, synthetic faces of the subject from any desired angle, pose, etc., and/or with any desired expression (e.g., smiling, eyes closed, frowning, etc.). In some examples, latent space manipulation (or editing) and neural animation techniques can be used to generate the synthetic content 102 (e.g., a synthetic face 102(1)) pertaining to the subject to achieve a desired angle, pose, expression, etc. of the synthetic face 102(1) and/or the synthetic body 102(2) of the subject (e.g., the user 110). For example, a neural animation vector can be applied to a point within a latent space associated with the trained machine learning model(s) 100 to obtain a modified latent space point, and then a synthetic face 102(1) of the subject can be generated using the trained machine learning model(s) 100 based at least in part on the modified latent space point. This can allow for generating an image of a synthetic face 102(1) of the subject with a facial expression (e.g., a mouth expression) that is more or less expressive (e.g., slightly more open, or slightly more closed), which can provide a synthetic (AI-generated) face 102(1) that is photoreal.

In general, the synthetic content 102 can be output in real-time via any suitable output device, such as a display(s), a speaker(s), or the like. In the example of FIG. 1, the synthetic content 102 is featured in video content 108, and the video content 108 can be displayed on a display of any suitable type of display device 118. FIG. 1 shows examples of a display device 118(1) (e.g., a television, a computer monitor, a tablet, a phone, a projector, etc.) and a head-mounted display (HMD) 118(2) (e.g., a VR headset, AR headset, MR headset, etc.), but these are merely examples, and other types of displays/display devices may be utilized to display the video content 108 featuring the synthetic content 102. In some examples, as shown in FIG. 1, the user 110 who is providing the prompt(s) (e.g., voice prompt 116) is also consuming (e.g., viewing, listening to, etc.) the synthetic content 102 as the synthetic content 102 is being output (e.g., displayed) in real-time. For example, the video content 108 featuring the synthetic content 102 may be displayed on a display of a display device 118 that is being viewed by the user 110 so that the user 110 can consume the video content 108 featuring the synthetic content 102 in real-time while the user 110 is live-prompting the model(s) 100.

The trained machine learning model(s) 100 may receive, as input, prompt data representing one or more prompts (e.g., image prompts, voice prompts, and/or text prompts, etc.), such as the user-provided prompt data 112 representing the voice prompt 116 provided by the user 110 in the example of FIG. 1. Accordingly, the user 110 can describe a person, an object, and/or a scene, and, in response to the received user-provided prompt data 112 representing this prompt(s) from the user 110, the machine learning model(s) 100 generates output data 104 representing synthetic content 102 (e.g., a synthetic face 102(1), a synthetic body 102(2), a synthetic background 102(3), etc.), which is rendered in real-time to a display of a display device 118. In some examples, video content 108 featuring the synthetic content 102 may be viewable by the user 110 who provided the prompt and/or by one or more other users. The level of immersion experienced by the viewing user(s) may depend on the type of display device 118 used to display the video content 108 featuring the synthetic content 102. For example, a more immersive experience may be provided by displaying the video content 108 on a HMD 118(2), such as a VR headset. For example, the user 110 wearing the HMD 118(2) may speak into the microphone(s) 114 to prompt the trained machine learning model(s) 100 to generate output data 104 representing synthetic content 102 that is displayed in real-time on the HMD 118(2). For a less immersive experience, the video content 108 may be displayed on a display device 118(1). In any case, the live prompting of the model(s) 100 by the user 110 guides the model(s) 100 to generate output data 104 representing photoreal synthetic content 102. In other words, the generative output data 104 is created by an algorithm that is prompted (e.g., by the user 110) in some way as to what to do.

As mentioned above, in some examples, the output data 104 generated by the trained machine learning model(s) 100 is fed back into the model(s) 100 as part of a feedback loop 120. This feedback loop 120 can be used for fine-tuning the model(s) 100 to generate output data 104 that is photoreal, such as by being temporally-coherent. For example, the generative output data 104 resulting from the real-time, iterative prompting of the model(s) 100 can be fed back into the model(s) 100 in real-time (e.g., via the feedback loop 120) to drive the model(s) 100 to generate further output data 104 as part of a real-time, iterative prompting system. In this manner, the trained machine learning model(s) 100 can iteratively learn from, among other things, the live prompting, its own generative output (e.g., output data 104), and/or the training dataset 106 used to train/re-train the machine learning model(s) 100. Accordingly, a real-time, iterative prompting system with a learning feedback loop 120 can be used to fine-tune train the machine learning model(s) 100 in an ad hoc, real-time sense against the live, iterative input (e.g., user-provided prompt data 112) and/or output (e.g., output data 104).

The output data 104 generated by the trained machine learning model(s) 100 is sui generis, and the output data 104 can represent any suitable type of content, such as image content, video content, audio content, or the like. The live prompting provided by the user 110 can be aimed at various aspects of the synthetic content 102, such as an appearance of what the user 110 would like to see in the synthetic content 102. For example, the user 110 might say something like "make it nighttime," and the model(s) 100 generates output data 104 corresponding to images of a night scene. Additionally, or alternatively, the live prompting provided by the user 110 can be aimed at motion of objects, elements, subjects (e.g., people), faces, etc. For example, the user 110 might say something like "show John Smith climbing a tree," and the model(s) 100 generates output data 104 corresponding to a synthetic version of John Smith (e.g., a famous actor) climbing a tree frame-to-frame in the video content 108.

As mentioned above, the model(s) 100 can be constrained in one or more ways. For example, a suite of machine learning models 100 can be used, each model 100 being constrained to outputting a specific type of output data 104 to obtain a specialized model 100. For example, a first model 100 may specialize in generating output data 104 representing a synthetic face 102(1), such as a face of a particular subject (e.g., person), while a second model 100 may specialize in generating output data 104 representing synthetic snow, while a third model 100 may specialize in generating output data 104 representing synthetic night scenes, while a fourth model 100 may specialize in generating output data 104 representing synthetic buildings, and so on and so forth. One can appreciate that any suitable number of different models 100 can be implemented, each specializing in generating output data 104 at any suitable level of granularity or specificity. In some examples, a combination of such models 100 may be synchronized and/or configured to interact with each other at runtime in order to generate their respective outputs, and the output data 104 from each model 100 may be combined to generate video data corresponding to the video content 108 featuring the synthetic content 102 associated with each model 100. Implementing specialized models 100 may improve the quality of the output data 104 and/or help achieve real-time output of synthetic content 102 (e.g., on a display), as compared to tasking a single model 100 with generating multiple different types of synthetic content 102 and/or an entire scene of synthetic content 102.

As mentioned above, in some examples, the video content 108 that is displayed in real-time can be generated entirely by the trained machine learning model(s) 100. This means that a video capture device (e.g., a video camera) need not be used to film anything during the creation of the video content 108, which can be entirely synthetic 102. For instance, in the example of FIG. 1, the user 110 can prompt the trained machine learning model(s) 100 to generate video content 108 of a famous actor named John Smith walking outside on a sunny day, and the trained machine learning model(s) 100 may, in response to this prompt, generate the requested synthetic content 102 (which corresponds to the video content 108 in this example) without requiring the presence of John Smith at all and without needing to film an outdoor environment on a sunny day, because the machine learning model(s) 100 may have been trained with a robust dataset of images of John Smith and sunny outdoor scenery to be able to generate output data 104 representing the synthetic content 102 that is rendered as the video content 108 in real-time, with the live prompting from the user 110.

In some examples, the output data 104 generated by the model(s) 100 is combined with input video data generated by a video capture device (e.g., a video camera) to generate output video data that corresponds to the video content 108. In this example, the video content 108 may feature the synthetic content 102 within a real-world scene captured by the video capture device. For example, the synthetic face 102(1) in FIG. 1 may be overlaid on a face of a real person who is being, or was, filmed using a video capture device, and/or the synthetic body 102(2), may be overlaid on a body of the real person, and/or a synthetic background 102(3) (or synthetic background elements) may be added to a real-world scene that is being, or was, captured by the video capture device.

Figure 2A:
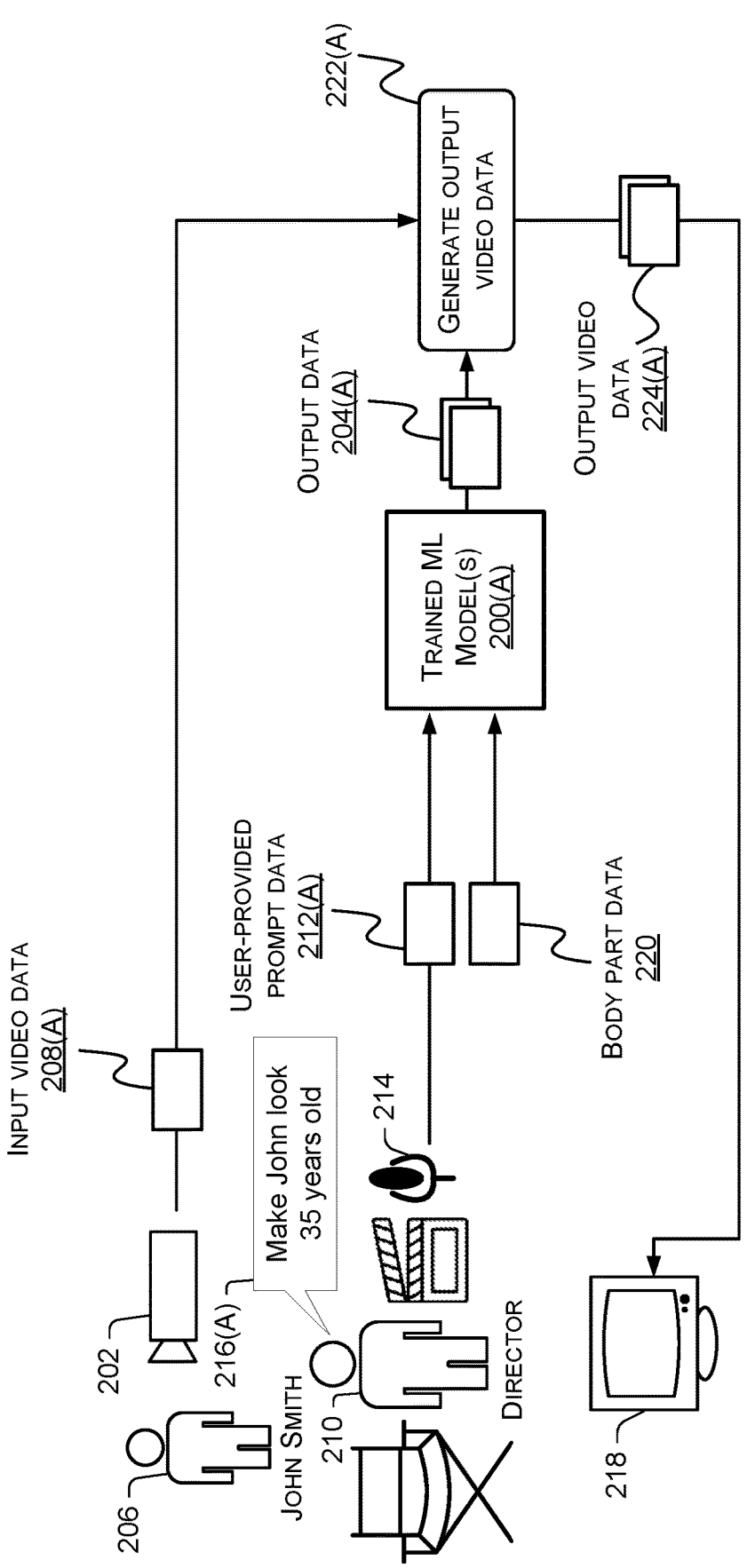
FIG. 2A is a diagram illustrating an example technique for the real-time output of video content featuring an AI-generated, photoreal synthetic body part of a subject within a real-world scene that is being captured by a video capture device.

FIG. 2A is a diagram illustrating an example technique for the real-time output of video content featuring an AI-generated, photoreal synthetic face within a real-world scene that is being captured by a video capture device. In the example of FIG. 2A, a user 210 may represent a director of a movie on a movie set where a scene(s) of the movie is being filmed. The user 210 of FIG. 2A may represent the user 110 of FIG. 1. A subject 206 (e.g., a person) is also depicted in FIG. 2A. For example, the user 210 (sometimes referred to herein as a "director 210") may be directing the subject 206 (sometimes referred to herein as a "person 206," or an "actor 206"). In the example of FIG. 2A, the actor's 206 name is John Smith, and the actor 206 is acting in a scene of the movie. Meanwhile, a video capture device 202 is capturing (e.g., recording, filming, etc.) a real-world scene including the actor 206, while the actor 206 is performing for the scene of the movie. In the example of FIG. 2A, a trained machine learning model(s) 200(A) may receive user-provided prompt data 212(A) representing a prompt (e.g., a voice prompt 216(A)) provided by the director 210. For example, the director 210 may speak into a microphone(s) 214 to prompt the model(s) 200(A) with the words "Make John look 35 years old." The microphone(s) 214 of FIG. 2A may be the same as or similar to the microphone 114 of FIG. 1, and/or the trained machine learning model(s) 200(A) may be the same as or similar to the trained machine learning model(s) 100 of FIG. 1.

In addition to the user-provided prompt data 212(A) (e.g., representing the voice prompt 216(A)), body part data 220 (e.g., face data) can be provided to the trained machine learning model(s) 200(A) as additional prompt data. In this example, the body part data 220 may represent the face (or other body part) of the subject 206. The body part data 220 can be image data (e.g., a face image(s), an image of another body part besides the face, such as a torso image, etc.), body part mapping data (e.g., face mapping data), a body part rigging diagram (e.g., a facial rigging diagram), 3D model data of a face (or other body part), or a combination thereof. In some examples, the trained machine learning model(s) 200(A) may specialize in generating output data 204(A) representing a synthetic face 102(1) and/or a synthetic body part (e.g., synthetic body 102(2), such as a synthetic face (or other body part) of a particular subject 206 (e.g., person, actor, etc.). In some examples, the model(s) 200(A) is configured to generate output data 204(A) representing a synthetic face (or other body part) from any angle and/or at any age (e.g., young, old, and ages therebetween). Accordingly, the output data 204(A) generated using the model(s) 200(A) can be based at least in part on the user-provided prompt data 212(A) and the body part data 220 provided as inputs to prompt the model(s) 200(A). In this sense, the techniques and systems described herein may support "multi-modal" live prompting, wherein multiple different types of prompt data are provided as inputs to prompt one or more trained machine learning models 200(A) to generate output data 204(A). That is, the director 210 may prompt the model(s) 200(A) (e.g., with a voice prompt 216(A)) on top of the body part data 220 that is also provided to the model(s) 200(A) as additional prompt data. In some examples, the body part data 220 represents input video data 208(A) representing the face (or other body part) of the subject 206 (e.g., person, actor, etc.) in the real-world scene that is being, or was, captured by the video capture device 202. For example, the body part data 220 may be, or include, one or more frames of the input video data 208(A) representing the real-world scene and featuring the face (or other body part) of the subject 206.

Based at least in part on the user-provided prompt data 212(A) and on the body part data 220 (i.e., additional prompt data relating to a face(s) (or other body part(s))), the trained machine learning model(s) 200(A) may be used to generate output data 204(A) representing a synthetic face 102(1) and/or a synthetic body part (e.g., synthetic body 102(2)). Meanwhile, as depicted in FIG. 2A, input video data 208(A) generated by the video capture device 202 may be received as the video capture device 202 is capturing a real-world scene (e.g., a real-world scene including the actor 206 performing a scene of the movie). Although the example of FIG. 2A depicts a real-world scene that is being captured (e.g., filmed, recorded, etc.) live to generate the input video data 208(A), the input video data 208(A) may represent pre-recorded video data, in some examples. For example, the input video data 208(A) may correspond to pre-recorded video content (e.g., footage of a scene from an existing movie, a television show; etc.).

At block 222(A), output video data 224(A) may be generated based at least in part on the input video data 208(A) and the AI-generated output data 204(A), and this output video data 224(A) may correspond to video content featuring the synthetic content 102 (e.g., the synthetic face 102(1) and/or a synthetic body part (e.g., synthetic body 102(2)) within the real-world scene (e.g., a real-world scene that is being captured by the video capture device 202, a pre-recorded real-world scene, etc.). This video content corresponding to the output video data 224(A) may be displayed on a display (e.g., of a display device 218). In an illustrative example, the synthetic face 102(1) and/or the synthetic body part (e.g., synthetic body 102(2)) represented by the AI-generated output data 204(A) may be overlaid on the face (or other body part) of the subject 206 (e.g., person, actor, etc.) in the real-world scene that is being, or was, captured by the video capture device 202. In this way, the displayed video content may include a mixture of "real" content and synthetic content 102, and/or the footage (e.g., input video data 208(A)) generated by the video capture device 202 may at least be used as a "canvas" or a template for overlaying synthetic content 102 thereon. In some examples, a temporal tracking technique is used to track the face (or other body part) of the subject 206 featured in the input video data 208(A) to generate the body part data 220 that is provided to the model(s) 200(A) as additional prompt data. For example, the body part data 220 may include position data, orientation data, angle data, or the like to indicate a position, orientation, and/or angle of the face (or other body part) of the subject 206 in one or more frames of the input video data 208(A). Additionally, or alternatively, a temporal tracking technique can be used at block 222(A) to track the position, orientation, and/or angle of the face (or other body part) of the subject 206 to generate the output video data 224(A). In this manner, at block 222(A), a synthetic face 102(1) and/or a synthetic body part (e.g., synthetic body 102(2)) can be tracked (e.g., overlayed) onto the face (or other body part) of the subject 206 featured in the input video data 208(A), which results in output video data 224(A) representing synthetic content 102 that is temporally-coherent.

As mentioned above, in some examples, the output data 204(A) generated by the trained machine learning model(s) 200(A) is fed back into the model(s) 200(A) as part of a feedback loop (e.g., the feedback loop 120 of FIG. 1), which can be used for fine-tuning the model(s) 200(A) to generate output data 204(A) that is photoreal, such as by being temporally-coherent. For example, the generative output data 204(A) resulting from the real-time, iterative prompting of the model(s) 200(A) can be fed back into the model(s) 200(A) in real-time to drive the model(s) 200(A) to generate further output data 204(A) as part of a real-time, iterative prompting system. In the example of FIG. 2A, the model(s) 200(A) is prompted with body part data 220 representing a source body part (e.g., a face (or other body part) of an actor 206 performing a scene of a movie that is being captured by a video capture device 202 or a pre-recorded scene of a movie), and the video footage (e.g., input video data 208(A)) featuring the source body part (e.g., face) exhibiting movements (e.g., facial expressions) and/or the AI-generated synthetic face 102(1) and/or synthetic body part (e.g., synthetic body 102(2)) exhibiting similar movements (e.g., facial expressions) can be fed back into the model(s) 200(A) in real-time to drive the generative output based at least in part on a human performance (e.g., live or pre-recorded human performance). In this manner, the model(s) 200(A) can iteratively learn from the live prompting (e.g., user-provided prompt data 212(A)), from the live video data 208(A) being captured, and/or from its own generative output (e.g., the output data 204(A)) in addition to the training dataset 106 of images (e.g., face images, images of other body parts, etc.) used to train/re-train the model(s) 200(A). Accordingly, a real-time, iterative prompting system with a learning feedback loop (e.g., the feedback loop 120) can be used to fine-tune train the model(s) 200(A) in an ad hoc, real-time sense against the live, iterative input (e.g., user-provided prompt data 212(A)) and/or output (e.g., output data 204(A)).

In an illustrative use case, the director 210 may be directing a movie live and in real-time with prompts (e.g., with their voice, by speaking into the microphone(s) 214). In this illustrative use case, the user-provided prompt data 212(A) (which corresponds to a voice prompt(s) 216(A)) and the body part data 220 may be provided as inputs to prompt the model(s) 200(A) to generate output data 204(A) that represents a synthetic face 102(1) of the actor 206, and, at block 222(A), the synthetic face 102(1) may be overlaid on the face of the actor 206 that is exhibited in the input video data 208(A). The director 210 may be able to view, on a display of the display device 218, live video content featuring the synthetic face 102(1) in real-time as a movie scene is being filmed with the video capture device 202 (e.g., on the movie set). The live video content may feature AI-generated, synthetic content 102 overlayed atop the actor's 206 face in the footage being captured by the video capture device 202. Accordingly, the director 210 can see the photoreal synthetic content 102 (e.g., the synthetic face 102(1)) in real-time while the actor 206 is acting out the scene and can, therefore, direct the actor(s) 206 who is/are being filmed using this "live feedback loop" of AI-generated synthetic content 102 as a visual cue (or tool) to get an idea of what the end product (e.g., the movie) will look like, which can improve their directing. In an example, the director 210 may use the trained machine learning model(s) 200(A) to de-age the actor 206, and, in this example, the director 210, and in some cases the actor 206 himself/herself, can see a younger version of the actor 206, which may assist the director 210 in directing the "young" actor 206 instead of directing the older, present-day actor 206. This example may also assist the actor 206 in fine tuning their performance, if, say, the actor 206 can view the display device 218 that is displaying the video content featuring the synthetic content 102 (e.g., the synthetic face 102(1)), which may allow the actor 206 to visualize himself/herself as a young person.

In another illustrative use case, the director 210 may be directing a movie live and in real-time with prompts (e.g., with their voice, by speaking into the microphone(s) 214). In this illustrative use case, the user-provided prompt data 212(A) (which corresponds to a voice prompt(s) 216(A)) and the body part data 220 may be provided as inputs to prompt the model(s) 200(A) to generate output data 204(A) that represents a synthetic body 102(2) of the actor 206, and, at block 222(A), the synthetic body 102(2) may be overlaid on the body of the actor 206 that is exhibited in the input video data 208(A). The director 210 may be able to view, on a display of the display device 218, live video content featuring the synthetic body 102(2) in real-time as a movie scene is being filmed with the video capture device 202 (e.g., on the movie set). The live video content may feature AI-generated, synthetic content 102 overlayed atop the actor's 206 body in the footage being captured by the video capture device 202. Accordingly, the director 210 can see the photoreal synthetic content 102 (e.g., the synthetic body 102(2)) in real-time while the actor 206 is acting out the scene and can, therefore, direct the actor(s) 206 who is/are being filmed using this "live feedback loop" of AI-generated synthetic content 102 as a visual cue (or tool) to get an idea of what the end product (e.g., the movie) will look like, which can improve their directing. In an example, the director 210 may use the trained machine learning model(s) 200(A) to dress the actor 206 in different clothes/attire, and, in this example, the director 210, and in some cases the actor 206 himself/herself, can see the differently-dressed actor 206.

In the above example use cases, the input video data 208 is generated live, in real-time with the user-provided prompt data 212. It is to be appreciated, however, that the input video data 208 can be pre-recorded, in some examples. As such, a user 110, 210 could prompt the model(s) 100, 200 to generate output data 104, 204 that represents a synthetic body part (e.g., a synthetic face 102(1), a synthetic body 102(2), etc.) such that the synthetic body part is overlaid on the corresponding body part of the subject 206 that is exhibited in the pre-recorded, input video data 208. That is, the user 110, 210 can prompt the model(s) 100, 200 to de-age an actor 206 in an old film, or to artificially dress the actor 206 in different attire.

Figure 2B:
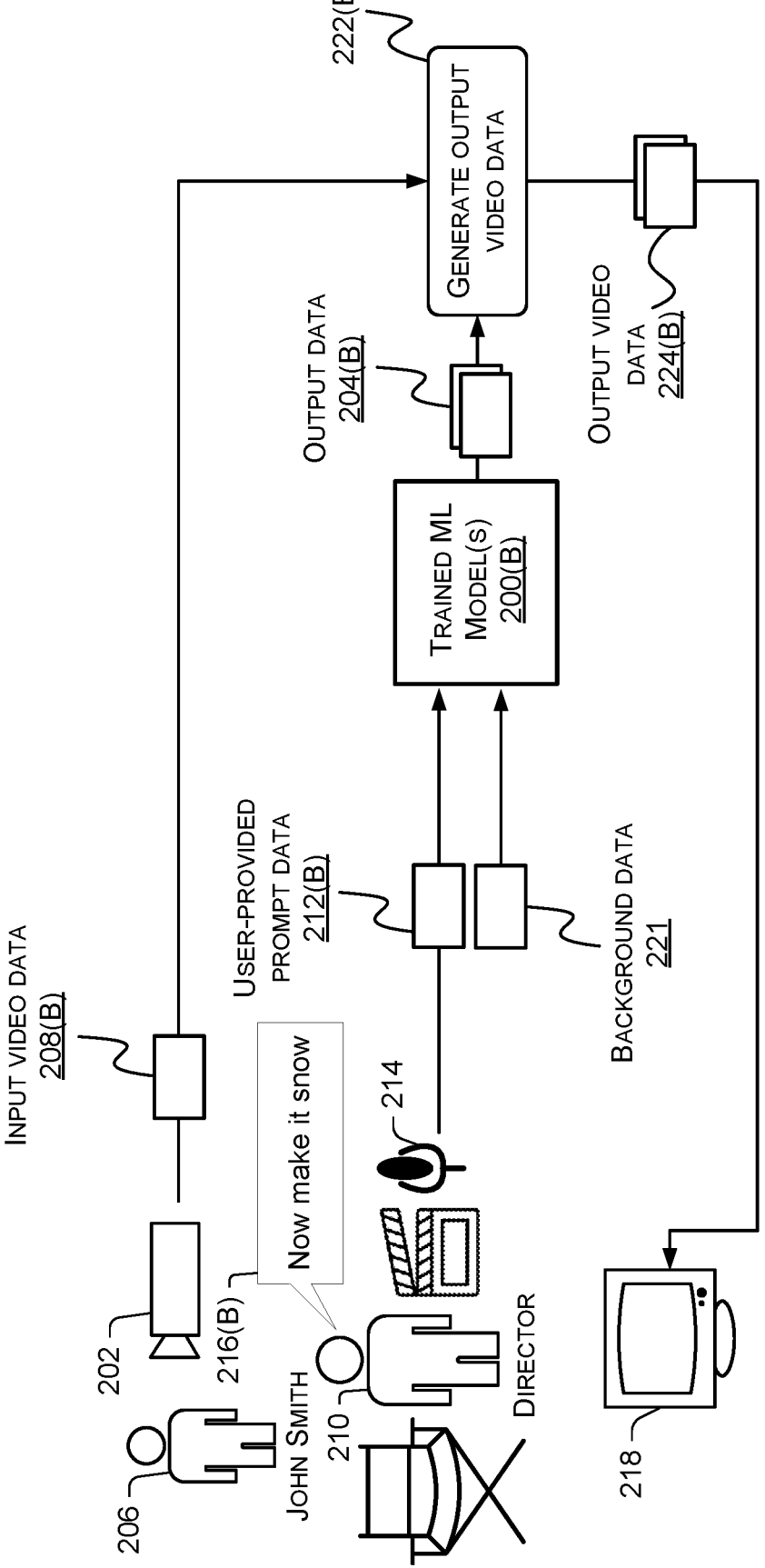
FIG. 2B is a diagram illustrating an example technique for the real-time output of video content featuring AI-generated, photoreal synthetic background content within a real-world scene that is being captured by a video capture device.

FIG. 2B is a diagram illustrating an example technique for the real-time output of video content featuring AI-generated, photoreal synthetic background content within a real-world scene that is being captured by a video capture device. In the example of FIG. 2B, the video capture device 202 may be capturing (e.g., recording, filming, etc.) a real-world scene including the actor 206 of FIG. 2A, but at a later time with respect to the real-world scene being captured in FIG. 2A. Accordingly, in the example of FIG. 2B, a trained machine learning model(s) 200(B) may receive user-provided prompt data 212(B) representing an additional prompt(s) (e.g., another voice prompt 216(B)) provided by the director 210. For example, the director 210 may speak into the microphone(s) 214 to prompt the model(s) 200(B) with the words "Now make it snow." The trained machine learning model(s) 200(B) may be the same as or similar to the trained machine learning model(s) 100 of FIG. 1. In some examples, the model(s) 200(B) of FIG. 2B may be different than the model(s) 200(A) of FIG. 2A, such as a model(s) 200B that is specialized in generating different output data 204(B) than the output data 204(A) generated by the model(s) 200(A). For example, the output data 204(A) generated by the model(s) 200(A) may represent a synthetic face 102(1) while the output data 204(B) generated by the model(s) 200(B) may represent synthetic snow.

In addition to the user-provided prompt data 212(B) (e.g., representing the voice prompt 216(B)), background data 221 can be provided to the trained machine learning model(s) 200(B) as additional prompt data. In this example, the background data 221 may represent input video data 208(B) representing the background in the real-world scene that is being, or was, captured by the video capture device 202. For example, the background data 221 may be, or include, one or more frames of the input video data 208(B) representing the real-world scene and featuring a background of the environment behind the subject 206. In some examples, the trained machine learning model(s) 200(B) may specialize in generating output data 204(B) representing a synthetic background 102(3). Accordingly, the output data 204(B) generated using the model(s) 200(B) can be based at least in part on the user-provided prompt data 212(B) and the background data 221 provided as inputs to prompt the model(s) 200(B). That is, the director 210 may prompt the model(s) 200(B) (e.g., with a voice prompt 216(B)) on top of the background data 221 that is also provided to the model(s) 200(B) as additional prompt data.

Based at least in part on the user-provided prompt data 212(B) and on the background data 221 (i.e., additional prompt data relating to background of the real-world scene that is being, or was, captured by the video capture device 202), the trained machine learning model(s) 200(B) may be used to generate output data 204(B) representing a synthetic background 102(3), such as synthetic snow. Meanwhile, as depicted in FIG. 2B, input video data 208(B) generated by the video capture device 202 may be received as the video capture device 202 is capturing the real-world scene (e.g., including the actor 206 performing a scene of the movie). At block 222(B), output video data 224(B) may be generated based at least in part on the input video data 208(B) and the AI-generated output data 204(B), and this output video data 224(B) may correspond to video content featuring synthetic content 102 (e.g., synthetic snow) within the real-world scene that is being captured by the video capture device 202. This video content may be displayed on a display (e.g., of a display device 218) based at least in part on the output video data 224(B). In an illustrative example, the synthetic snow represented by the AI-generated output data 204(B) may be overlaid on the real-world scene that is being captured by the video capture device 202. In this way, the displayed video content may include a mixture of "real" content and synthetic content 102, and/or the footage (e.g., the input video data 208(B)) generated by the video capture device 202 may at least be used as a "canvas" or a template for overlaying synthetic content 102 thereon. In some examples, a temporal tracking technique is used to track the background of the real-world scene featured in the input video data 208(B) to generate the background data 221 that is provided to the model(s) 200(B) as additional prompt data. For example, the background data 221 may include position data, orientation data, angle data, or the like to indicate a position, orientation, and/or angle an object(s) and/or element(s) in one or more frames of the input video data 208(B). Additionally, or alternatively, a temporal tracking technique can be used at block 222(B) to track the position, orientation, and/or angle of a background object(s) and/or element(s) in the real-world scene to generate the output video data 224(B). In this manner, at block 222(B), a synthetic background 102(3) can be tracked (e.g., overlayed) onto the background featured in the input video data 208(B), which results in output video data 224(B) representing synthetic content 102 that is temporally-coherent.

In some examples, the output video data 224(B) may be based on the input video data 208(B), the AI-generated output data 204(B), and the AI-generated output data 204(A) (and potentially additional AI-generated output data). As such, the output video data 224(B) may correspond to video content that features multiple different types of synthetic content 102 (e.g., a synthetic face 102(1) of the actor 206 as a young person, synthetic snow, etc.) within the real-world scene that is being captured by the video capture device 202. In this manner, the second voice prompt 216(B) provided by the user 210 may build upon the first voice prompt 216(A) such that the actor 206 is first de-aged, and then it starts snowing in the real-world scene that is being captured by the video capture device 202. Accordingly, the user 210 can continue to prompt the AI model(s) 200 with additional prompts in order to iteratively build upon an original synthetic manipulation of a source performance.

As mentioned above, in some examples, the output data 204(B) generated by the trained machine learning model(s) 200(B) is fed back into the model(s) 200(B) as part of a feedback loop (e.g., the feedback loop 120 of FIG. 1), which can be used for fine-tuning the model(s) 200(B) to generate output data that is photoreal, such as by being temporally-coherent. For example, the generative output data 204(B) resulting from the real-time, iterative prompting of the model(s) 200(B) can be fed back into the model(s) 200(B) in real-time to drive the model(s) 200(B) to generate further output data 204(B) as part of a real-time, iterative prompting system. In this manner, the model(s) 200(B) can iteratively learn from the live prompting (e.g., user-provided prompt data 212(B)), from the live video data 208(B) being captured, and/or from its own generative output (e.g., the output data 204(B)) in addition to the training dataset 106 of images (e.g., snow images) used to train/re-train the model(s) 200 (B). Accordingly, a real-time, iterative prompting system with a learning feedback loop (e.g., the feedback loop 120) can be used to fine-tune train the model(s) 200(B) in an ad hoc, real-time sense against the live, iterative input (e.g., user-provided prompt data 212(B)) and/or output (e.g., output data 204(B)).

In an illustrative use case, the director 210 may prompt the model(s) 200(B) to generate photoreal synthetic content for the background of a scene, in real-time, as the scene is being filmed. For example, the director 210 might say "Now make it snow;" and this voice prompt 216(B) causes the trained machine learning model(s) 200(B) to generate output data 204(B) representing synthetic snow that is, in turn, used to generate the output video data 224(B) for rendering the synthetic snow in the video content displayed on the device 218. Although synthetic snow is used in the example of FIG. 2B, one can appreciate that the model(s) 200(B) may be trained to generate output data 204(B) of any kind based on user-provided prompt data 212(B). Accordingly, the director 210 could say something like: "Now make it night," "Now make it 5 PM," "Now make it rain," "Now make it sunny," "Show me a house," "Show me a tree next to the house," or any similar prompt to create any desired synthetic content 102 on-demand, assuming the machine learning model 200(B) has been trained to generate output data 204(B) corresponding to such synthetic content.

As mentioned above, the model(s) 200(A), 200(B) can be constrained in one or more ways. For example, the model(s) 200(A), 200(B) may specialize in generating output data

204(A), 204(B) representing synthetic content in a particular style, such as a particular style of imagery (e.g., video) associated with the director 210. That is, the director 210 may be known for directing movies with a particular style of imagery (e.g., video) in terms of the lighting, the colors, the tone, the appearance of the characters, the camera angles in which the movie is shot, etc., and the model(s) 200(A), 200(B) can constrained to replicate that particular style of imagery (e.g., video). In another example, the output data 204(A), 204(B) may correspond to synthetic audio content (e.g., synthetic music, such as a synthetic song), and the model(s) 200(A), 200(B) may be constrained to replicate a particular style of a musician or another type of musical performing artist, such as a disc jockey (DJ). For instance, the user 210 might prompt the model(s) 200(A), 200(B) to generate output data 204(A), 204(B) representing a synthetic song in the style of a famous DJ, or in the styles of a combination of famous DJs (e.g., a blend of two different artists). Implementing specialized models 200(A), 200(B) may improve the quality of the output data 204(A), 204(B) to tailor the AI-generated synthetic content 102 for a particular application, and/or to help achieve real-time output of synthetic content 102 (e.g., on a display), as compared to tasking a single model with generating synthetic content 102 in multiple different styles.

As mentioned above, in some examples, the trained machine learning model(s) 200(A), 200(B) may generate output data 204(A), 204(B) for a sparse set of frames (e.g., a subset, but not all, of the series of frames that constitute the output video data 224(A), 224(B) corresponding to the video content that is rendered on a display in real-time). This conserves processing resources that are utilized for the model(s) 200(A), 200(B) to generate the output data 204(A), 204(B) without compromising the quality of the video content that is rendered on the display. For example, a viewing user (e.g., the user 210) may be unable to notice that the synthetic content 102 is not generated for every frame of the video content rendered on the display device 218 due to the relatively high frame rate (e.g., 90 Hertz (Hz), 120 Hz, etc.) at which the video content is rendered. In some examples, generating output data 204(A), 204(B) for a sparse set of frames may involve using an additional trained machine learning model(s) 200 that is specialized in interpolating movement of objects and/or elements between frames, and this specialized interpolation model(s) 200 may interact with a primary model(s) 200(A), 200(B) that is in charge of generating output data 204(A), 204(B) representing the desired synthetic content 102 in the sparse set of frames.

Figure 3:
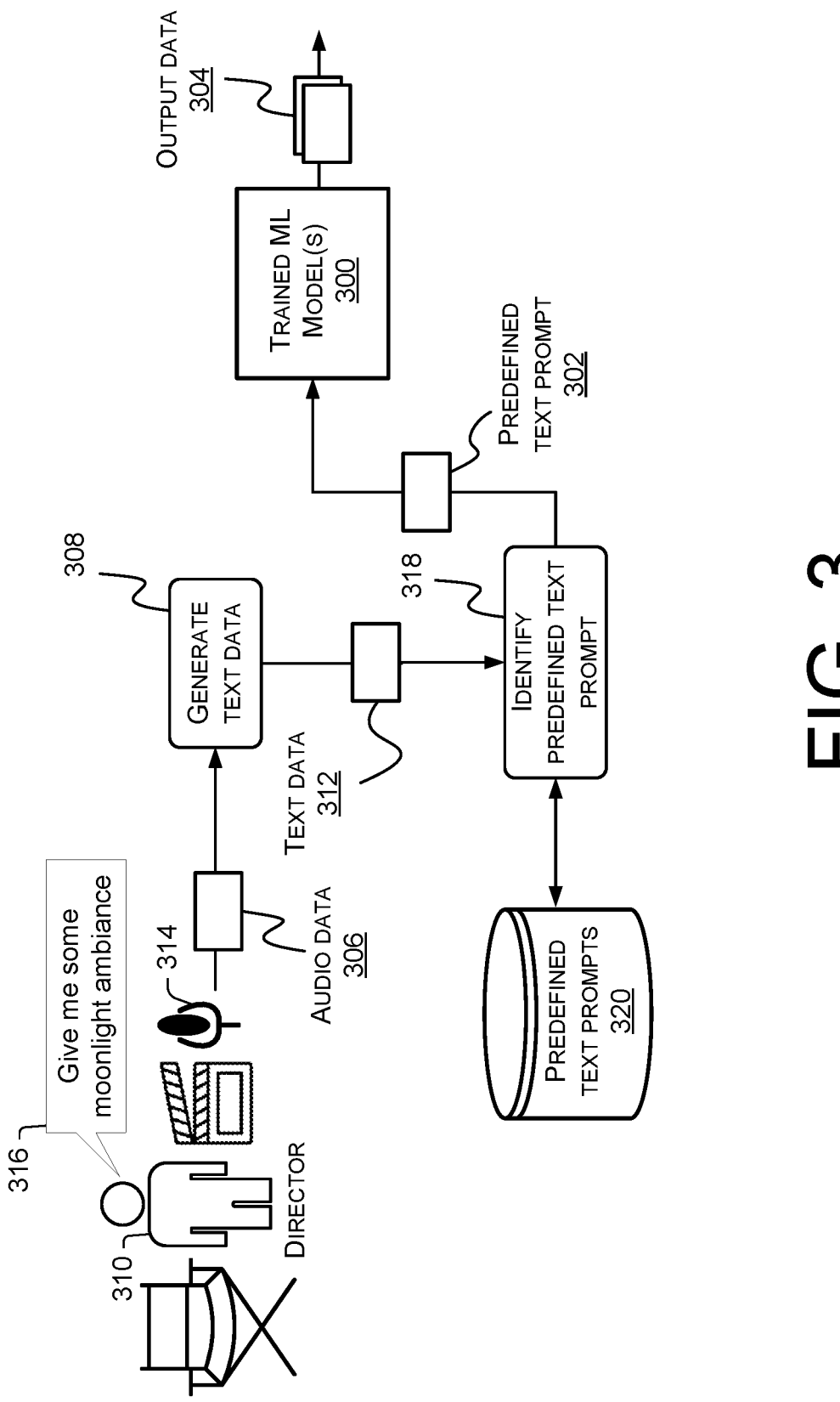
FIG. 3 is a diagram illustrating an example technique for mapping a user-provided voice prompt to a predefined text prompt, and using the predefined text prompt to prompt a trained AI model(s) to output photoreal synthetic content in real-time.

FIG. 3 is a diagram illustrating an example technique for mapping a user-provided voice prompt 316 to a predefined text prompt 302, and using the predefined text prompt 302 to prompt a trained AI model(s) 300 to output photoreal synthetic content in real-time. In some cases, a user 310 (who may represent the user 110 of FIG. 1) may desire to prompt a trained machine learning model(s) 300 (which may be the same as or similar to the trained machine learning model(s) 100 of FIG. 1) using a particular jargon that the model(s) 300 is unable to process as-is. For example, the user 310 may represent a director of a movie on a movie set where a scene(s) of the movie is being filmed, and the director 310 may use "film industry jargon" to prompt the model(s) 300. In the example of FIG. 3, the director 310 may speak into a microphone(s) 314 (which may be the same as or similar to the microphone 114 of FIG. 1) to prompt the model(s) 300 with the words "Give me some moonlight ambiance." In this example, the technique illustrated in FIG.

3 may allow for "translating" the voice prompt 316 into a predefined text prompt 302 that the model(s) 300 is able to process in order to generate output data 304 representing synthetic content 102.

For example, user-provided prompt data, in the example of FIG. 3, may include audio data 306 representing the voice prompt 316 provided by the user 310 and captured by the microphone(s) 314. That is, the microphone(s) 314 may capture user speech from the voice prompt 316 by detecting sound in the vicinity of the microphone(s) 314, and may generate audio data that represents the detected sound. At block 308, a processor(s) may generate text data 312 based at least in part on the audio data 306, the text data 312 representing the audio data 306 and/or the words of the voice prompt 316. Any suitable speech-to-text technology can be used at block 308 to convert the audio data 306 generated by the microphone(s) 314 into text data 312 representing the voice prompt 316. For example, a processor(s) may utilize an ASR component and/or NLU component to generate the text data 312 based on user speech exhibited in the audio data 306. At block 314, a processor(s) may identify, from a list of predefined text prompts 320, a predefined text prompt 302 that corresponds to the text data 312. For example, the predefined text prompt 302 may be identified at block 318 based at least in part on the text data 312 including a number of words that match a threshold percentage of the words in the predefined text prompt 302 and/or a number of words that are synonymous with a threshold percentage of the words in the predefined text prompt 302. For example, if some or all of the words in the text data 312 match and/or are synonymous with at least 80% of the words in the predefined text prompt 302 and/or if the sequence of the matching/synonymous words are the same, the predefined text prompt 302 may be identified as matching the text data 312. In some examples, a language mapping library can be utilized to map common industry jargon to text prompts that are more easily processible by the model(s) 300. For example, the utterance "shoot from a side angle" may be mapped to the predefined text prompt 302 "record from a side angle." Based on the predefined text prompt 302, the trained machine learning model(s) 300 may be used to generate output data 304 representing synthetic content 102. Using the technique of FIG. 3, the user 310 can continue to prompt the model(s) 300 using their familiar jargon, such as industry jargon, and the model(s) 300 can "interpret" the user-provided prompt data to generate output data 304 representing synthetic content.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is a flow diagram of an example process 400 for training AI models to generate real-time, temporally-coherent output data representing photoreal synthetic content. The process 400 may be implemented by one or more processors (e.g., a processor(s) of a computing system and/or computing device, such as the computing device 800 of FIG. 8). For discussion purposes, the process 400 is described with reference to the previous figures.

At 402, a processor(s) may train one or more AI (e.g., machine learning) models using sequential video frames (e.g., of video data 106(1)) as training data 106 to obtain one or more trained AI (e.g., machine learning) models 100, 200, 300 configured to generate temporally-coherent output data 104, 204, 304. For example, the AI model(s) may be trained, at block 402, using footage (e.g., sequential video frames) featuring an object(s) and/or elements in motion, such as a face (or other body part) moving, snow falling, rain falling, trees blowing, a ball bouncing, a vehicle moving, a person walking, etc. By training the AI model(s) with such footage at block 402, the AI model(s) learns how to generate output data 104 representing synthetic content 102 in a temporally-coherent manner. For example, if the AI model(s) is trained at block 402 to generate synthetic content 102 over a series of frames of video content (e.g., the video content 108), then the video content that is output frame-by-frame on a display will feature synthetic content 102 that appears to be moving as expected by a viewing user based on the user's real life experiences of seeing such movement in the real-world, as opposed to synthetic content 102 that looks glitchy frame-to-frame.

At 404, the processor(s) may train multiple different AI models on different types of training data 106 to obtain multiple different trained AI models 100, 200, 300 that are configured to generate different types of synthetic content. For example, a first AI model may be trained at block 404 on body part data 106(2) to obtain a trained AI model 100, 200, 300 that is specialized in generating output data 104, 204, 304 representing a synthetic face 102(1) and/or a synthetic body part (e.g., synthetic body 102(2)), such as a face (or other body part) of a particular subject (e.g., person), while a second AI model may be trained at block 404 on images of snow to obtain a trained AI model 100, 200, 300 that is specialized in generating output data 104, 204, 304 representing synthetic snow, while a third AI model may be trained at block 404 on images of night scenes to obtain a trained AI model 100, 200, 300 that is specialized in generating output data 104, 204, 304 representing synthetic night scenes, while a fourth AI model may be trained at block 404 on images of buildings to obtain a trained AI model 100, 200, 300 that is specialized in generating output data 104, 204, 304 representing synthetic buildings, and so on and so forth. One can appreciate that any suitable number of different AI models can be trained at block 404 to implement any suitable number of specialized AI models 100, 200, 300, each configured to generate specific output data 104, 204, 304 at any suitable level of granularity or specificity.

At 406, the processor(s) may configure multiple different AI models to interact with each other at runtime. The configuration performed at block 406 may include the creation of one or more application programming interfaces (APIs) that are usable by the multiple different AI models to exchange data, and to generate output data 104, 204, 304 at runtime based on the data exchanged with another AI model(s). In some examples, this results in blending the respective output data 104, 204, 304 from the multiple different AI models at runtime to create synthetic content 102 from the multiple different AI models that is coherent and/or interleaved in some manner. In an illustrative example, if the user 110, 210, 310 prompts the third AI model mentioned above to "Make it nighttime," this third AI model may send the user-provided prompt data corresponding to the voice prompt to the first AI model mentioned above so that the first AI model can generate a synthetic face 102(1) and/or synthetic body part (e.g., synthetic body 102(2)) with lighting that is consistent with moonlight. In this way, the synthetic face 102(1) and/or synthetic body part (e.g., synthetic body 102(2)) produced by the first AI model is consistent with the synthetic nighttime scenery produced by the third AI model.

At 408, the processor(s) may constrain one or more of the AI models to a predefined set of prompts. In other words, the AI model(s) 100, 200, 300, once trained, may be prompted by the predefined set of prompts, and may refrain from generating output data based on prompts that are not within the predefined set of prompts. In some examples, the predefined set of prompts can be updated periodically as new prompts are discovered or to delete or otherwise modify existing ones of the predefined set of prompts. In some examples, the AI model(s) 100, 200, 300 can be constrained at block 408 by the prompt data 106(3) (of the training dataset 106) including the predefined set of prompts, as opposed to allowing any and all prompts to trigger generative output from the AI model(s) 100, 200, 300. Additionally, or alternatively, the model(s) 100, 200, 300 can be constrained at block 408 by a front-end filter that, at runtime, filters incoming prompts against a list of the predefined set of prompts, and if the incoming prompt is not on the list, the processor(s) may refrain from running the AI model(s) 100, 200, 300 to generate output data 104, 204, 304, which can conserve computing resources used for running the AI model(s) 100, 200, 300 at runtime. Training the AI model(s) at block 408 on a predefined set of prompts can also conserve computing resources used for training. This technique of constraining the AI model(s) can also help achieve real-time output of the synthetic content 102 by reducing the latency between the input prompt and the generation of the output data 104, 204, 304.

At 410, the processor(s) may constrain one or more of the AI models to a particular style of imagery, such as a particular style of video. In some examples, the AI model(s) 100, 200, 300 can be constrained at block 410 by the video data 106(1) and/or the body part data 106(2) (of the training dataset 106) including sequential video frames of a particular style of imagery (e.g., video), and using this video data to train the AI model(s) 100, 200, 300, and thereby constrain the AI model(s) 100, 200, 300 to the particular style of imagery (e.g., video). For example, a director 210, 310 may be known for directing movies with a particular style of imagery (e.g., video) in terms of the lighting, the colors, the tone, the appearance of the characters, the camera angles in which the movie is shot, etc., and the AI model(s) 100, 200, 300 can constrained at block 410 to replicate that particular style of imagery (e.g., video).

FIG. 5 is a flow diagram of an example process 500 for prompting a trained AI model(s) to output photoreal synthetic content in real-time. The process 500 may be implemented by one or more processors (e.g., a processor(s) of a computing system and/or computing device, such as the computing device 800 of FIG. 8). For discussion purposes, the process 500 is described with reference to the previous figures.

At 502, a processor(s) may receive user-provided prompt data 112, 212 representing a prompt provided by a user 110, 210, 310. As mentioned above, a prompt can be anything that triggers a trained AI model(s) 100, 200, 300 to generate output data 104, 204, 304, such as an audio (e.g., voice) prompt, a text prompt, an image prompt (e.g., body part data, such as face image data), a brainwave prompt, or a combination thereof. The user-provided prompt data 112, 212 may be received at block 502 based on an interaction of the user 110, 210, 310 with any suitable type of input device, such as a keyboard, a mouse, a touchpad, a touch screen, an electronic stylus, a handheld controller, a microphone, a brainwave input device (e.g., an EEG head-worn device, a microchip implanted in the brain, graphene-based sensors attached to the head of the user 110, 210, 310, etc.), or other type of input device. In the examples of FIGS. 1, 2A, 2B, and 3, the prompt provided by the user 110, 210, 310 is a voice prompt 116, 216, 316. In some examples, the prompt provided by the user 110, 210, 310 is a predefined prompt of a predefined set of prompts.

At 504, the processor(s) may generate, using a trained AI model(s) 100, 200, 300 based at least in part on the user-provided prompt data 112, 212, output data 104, 204, 304 representing synthetic content 102. At 506, for example, the processor(s) may identify a predefined text prompt 302 based at least in part on the user-provided prompt data 112, 212 and may prompt the trained AI model(s) 100, 200, 300 with the predefined text prompt 302. For example, the user-provided prompt data 112, 212 may include audio data 306 representing a voice prompt 316 provided by the user 310 and captured by a microphone(s) 314, and the processor(s) may generate, based at least in part on the audio data 306, text data 312 representing the voice prompt 316, identify, from a list of predefined text prompts 320, a predefined text prompt 302 that corresponds to the text data 312, and generate the output data 104, 204, 304 based at least in part on the predefined text prompt 302.

At 508, in some examples, the processor(s) may generate, using the trained AI model(s) 100, 200, 300 based at least in part on the user-provided prompt data 112, 212, output data representing a synthetic face 102(1) and/or synthetic body part (e.g., synthetic body 102(2)). For example, the synthetic face 102(1) may be used to de-age an actor 206 through swapping the actor's 206 face with their own face when they were younger. As another example, the synthetic body 102(2) may be used to artificially dress the actor 206 in different clothes/attire.

At 510, the processor(s) may cause, based at least in part on the output data 104, 204, 304, video content featuring the synthetic content 102 (e.g., the synthetic face 102(1) and/or synthetic body part (e.g., synthetic body 102(2)) to be displayed on a display 118, 218. For example, video content 108 featuring a synthetic body part (e.g., a synthetic face 102(1), a synthetic body 102(2), etc.), and/or a synthetic background 102(3) may be rendered on a display of a display device 118.

At 512, the processor(s) may provide, as part of a feedback loop 120, the output data 104, 204, 304, to the trained AI model(s) 100, 200, 300. As shown by the return arrow from block 512 to block 504, at least blocks 504-512 of the process 500 may iterate. For example, on a subsequent iteration, the processor(s), at block 504, may generate, using the trained AI model(s) 100, 200, 300 based at least in part on the first output data 104, 204, 304 received via the feedback loop 120, second output data 104, 204, 304 representing second synthetic content 102, and, at block 510, may cause, based at least in part on the second output data 104, 204, 304, second video content featuring the second synthetic content 102 to be displayed on the display, and, at block 512, may provide, as part of the feedback loop 120, the second output data 104, 204, 304 to the trained AI model(s) 100, 200, 300, and so on and so forth. This iterative feedback loop 120 can aid in fine-tuning the generation of photoreal synthetic content (e.g., by the AI model(s) 100, 200, 300 learning, through iterative feedback, to generate temporally-coherent output data 104, 204, 304). Additionally, or alternatively, additional user-provided prompt data 112, 212 may be received by the processor(s) after one or more iterations through the process 500, and in this scenario, the video content 108 displayed at block 510 may iteratively feature additional types of synthetic content 102 prompted by the user 110, 210, 310 (e.g., a synthetic face 102(1), followed by a synthetic body 102(2), followed by a synthetic background 102(3), etc.). In this manner, the additional prompts may be provided by the user 110, 210, 310 to build upon one or more previously-provided prompts. As such, the user 110, 210, 310 can continue to prompt the AI model(s) 100, 200, 300 with additional prompts in order to iteratively build upon an original synthetic manipulation.

FIG. 6 is a flow diagram of an example process 600 for the real-time output of video content featuring AI-generated, photoreal synthetic content within a real-world scene that is being captured by a video capture device. The process 600 may be implemented by one or more processors (e.g., a processor(s) of a computing system and/or computing device, such as the computing device 800 of FIG. 8). For discussion purposes, the process 600 is described with reference to the previous figures.

At 602, a processor(s) may receive input video data 208 generated by a video capture device 202. In some examples, the input video data 208 is pre-recorded video data. In some examples, the input video data 208 is received at block 602 as the video capture device 202 is capturing a real-world scene. The video capture device 202 may be a video camera, for example, filming a scene of a movie, a television show, or any other suitable video content. In some examples, the input video data 208 represents a face (or other body part) of person in the real-world scene.

At 604, the processor(s) may receive user-provided prompt data 112, 212 representing a prompt provided by a user 110, 210, 310. The operations performed at block 604 may be the same as or similar to the operations performed at block 502 of the process 500, as described above.

At 606, the processor(s) may generate, using a trained AI model(s) 100, 200, 300 based at least in part on the user-provided prompt data 112, 212, output data 104, 204, 304 representing synthetic content 102. At 608, for example, the processor(s) may provide the user-provided prompt data 212(A) to the trained AI model(s) 100, 200, 300 as first prompt data, and may provide body part data 220 representing a face (or other body part) of a person to the trained AI model(s) 100, 200, 300 as second/additional prompt data. In this example, the generating of the output data 104, 204, 304 at block 606 may be further based on the body part data 220, and the synthetic content 102 may include a synthetic body part (e.g., synthetic face 102(1), synthetic body 102(2), etc.). In some examples, the body part data 220 represents a face (or other body part) of a subject 206 (e.g., a person, actor, etc.) in the real-world scene that is being captured by the video capture device 202 to generate the input video data 208. For example, the body part data 220 used to prompt the trained AI model(s) 100, 200, 300 at block 608 may represent a face (or other body part) of an actor 206 being filmed using the video capture device 202. In some examples, the body part data 220 can include image data (e.g., image(s) of a body part (e.g., face)), body part mapping data, a body part rigging diagram, 3D model data of a body part, or a combination thereof).

At 610, in some examples, the output data 104, 204, 304 generated at block 606 is generated for a subset, but not all, of a series of frames for the video content that is to be rendered in real-time on a display. In other words, the trained AI model(s) 100, 200, 300 may generate, at block 610, output data 104, 204, 304 for a sparse set of frames (e.g., a subset, but not all, of the series of frames for output video data corresponding to the video content that is to be rendered on a display in real-time). This conserves processing resources that are utilized for the trained AI model(s) 100, 200, 300 to generate the output data 104, 204, 304 without compromising the quality of the video content that is rendered on the display. For example, a viewing user (e.g., the user 110, 210, 310) may be unable to notice that the synthetic content 102 is not generated for every frame of the video content rendered on the display device 118, 218 due to the relatively high frame rate (e.g., 90 Hz, 120 Hz, etc.) at which the video content is rendered. In some examples, generating output data 104, 204, 304 for a sparse set of frames at block 610 may involve using an additional trained AI model(s) 100, 200, 300 that is specialized in interpolating movement of objects and/or elements between frames, and this specialized interpolation model(s) 100, 200, 300 may interact with a primary AI model(s) 100, 200, 300 that is in charge of generating output data 104, 204, 304 representing the desired synthetic content 102 in the sparse set of frames.

At 612, the processor(s) may generate, based at least in part on the input video data 208 and the output data 104, 204, 304, output video data 224 corresponding to video content featuring the synthetic content 102 (e.g., the synthetic face 102(1), synthetic body 102(2), etc.) within the real-world scene that is being captured by the video capture device 202. This output video data 224 may include a series of frames. In some examples, at 614, the synthetic content 102 (e.g., the synthetic face 102(1), synthetic body 102(2)) represented by the AI-generated output data 104, 204, 304 may be overlaid on the real-world scene exhibited in the input video data 208 (e.g., the synthetic face 102(1) may be overlaid on the face of the subject 206 (e.g., person, actor, etc.) in the real-world scene that is being, or was, captured by the video capture device 202 and/or the synthetic body 102(2) may be overlaid on the body of the subject 206 in the real-world scene that is being, or was, captured by the video capture device 202).

At 616, the processor(s) may cause, based at least in part on the output video data 224, video content featuring the synthetic content 102 (e.g., the synthetic face 102(1), synthetic body 102(2), etc.) within the real-world scene to be displayed on a display 118, 218. For example, video content 108 featuring a synthetic face 102(1), a synthetic body 102(2), and/or a synthetic background 102(3) may be rendered within the real-world scene on a display of a display device 118. In this way, the displayed video content may include a mixture of "real" content and synthetic content 102, and/or the footage (e.g., input video data 208) generated by the video capture device 202 may at least be used as a "canvas" or a template for overlaying synthetic content 102 thereon.

In some examples, additional user-provided prompt data 112, 212 may be received by the processor(s) after one or more iterations through the process 600, and in this scenario, the video content 108 displayed at block 616 may iteratively feature additional types of synthetic content 102 prompted by the user 110, 210, 310 (e.g., a synthetic face 102(1), followed by a synthetic body 102(2), followed by a synthetic background 102(3), etc.). In this manner, the additional prompts may be provided by the user 110, 210, 310 to build upon one or more previously-provided prompts. As such, the user 110, 210, 310 can continue to prompt the AI model(s) 100, 200, 300 with additional prompts in order to iteratively build upon an original synthetic manipulation of a source performance and/or a real-world scene that is being, or was, captured by a video capture device 202.

Figure 7:
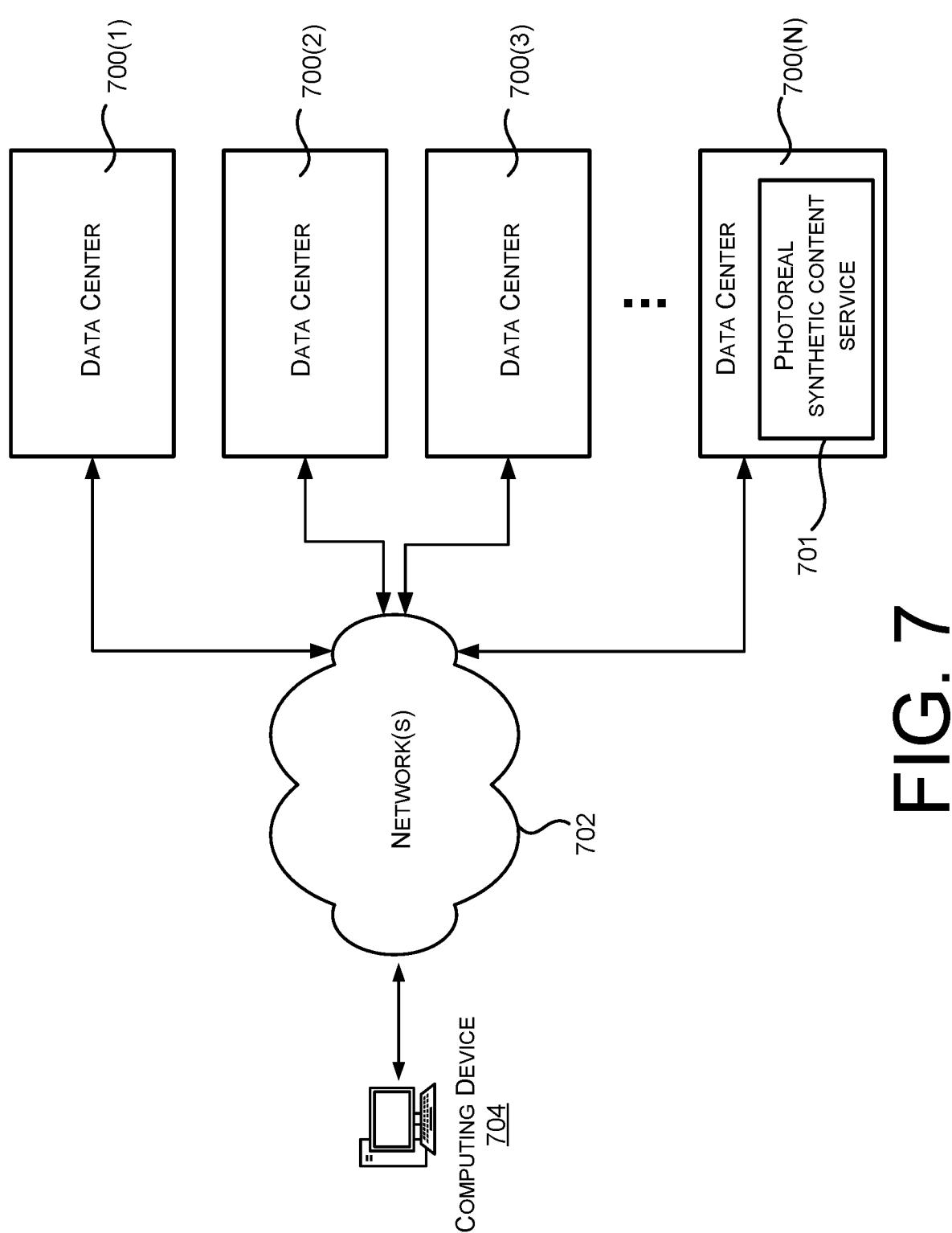
FIG. 7 is a system and network diagram that shows an illustrative operating environment that includes one or more components configured to implement aspects of the functionality described herein.

FIG. 7 is a system and network diagram that shows one illustrative operating environment for the configurations disclosed herein that includes a photoreal synthetic content service 701 configured to perform the techniques and operations described herein. The computing resources utilized by the photoreal synthetic content service 701 are enabled in one implementation by one or more data centers 700(1)-(N) (collectively 700). The data centers 700 are facilities utilized to house and operate computer systems and associated components. The data centers 700 typically include redundant and backup power, communications, cooling, and security systems. The data centers 700 can also be located in geographically disparate locations. In FIG. 7, the data center 700(N) is shown as implementing the photoreal synthetic content service 701. That is, the computing resources provided by the data center(s) 700 can be utilized to implement the techniques and operations described herein. In an example, these computing resources can include data storage resources, data processing resources, such as virtual machines, networking resources, data communication resources, network services, and other types of resources. Data processing resources can be available as physical computers or virtual machines in a number of different configurations. The virtual machines can be configured to execute applications, including web servers, application servers, media servers, database servers, and/or other types of programs. Data storage resources can include file storage devices, block storage devices, and the like. The data center(s) 700 can also be configured to provide other types of computing resources not mentioned specifically herein.

Users can access the above-mentioned computing resources over a network(s) 702, which can be a wide area communication network ("WAN"), such as the Internet, an intranet or an Internet service provider (ISP") network or a combination of such networks. For example, and without limitation, a computing device 704 operated by a user can be utilized to access the photoreal synthetic content service 701 by way of the network(s) 702. It should be appreciated that a local-area network ("LAN"), the Internet, or any other networking topology known in the art that connects the data centers 700 to remote user can be utilized. It should also be appreciated that combinations of such networks can also be utilized.

Figure 8:
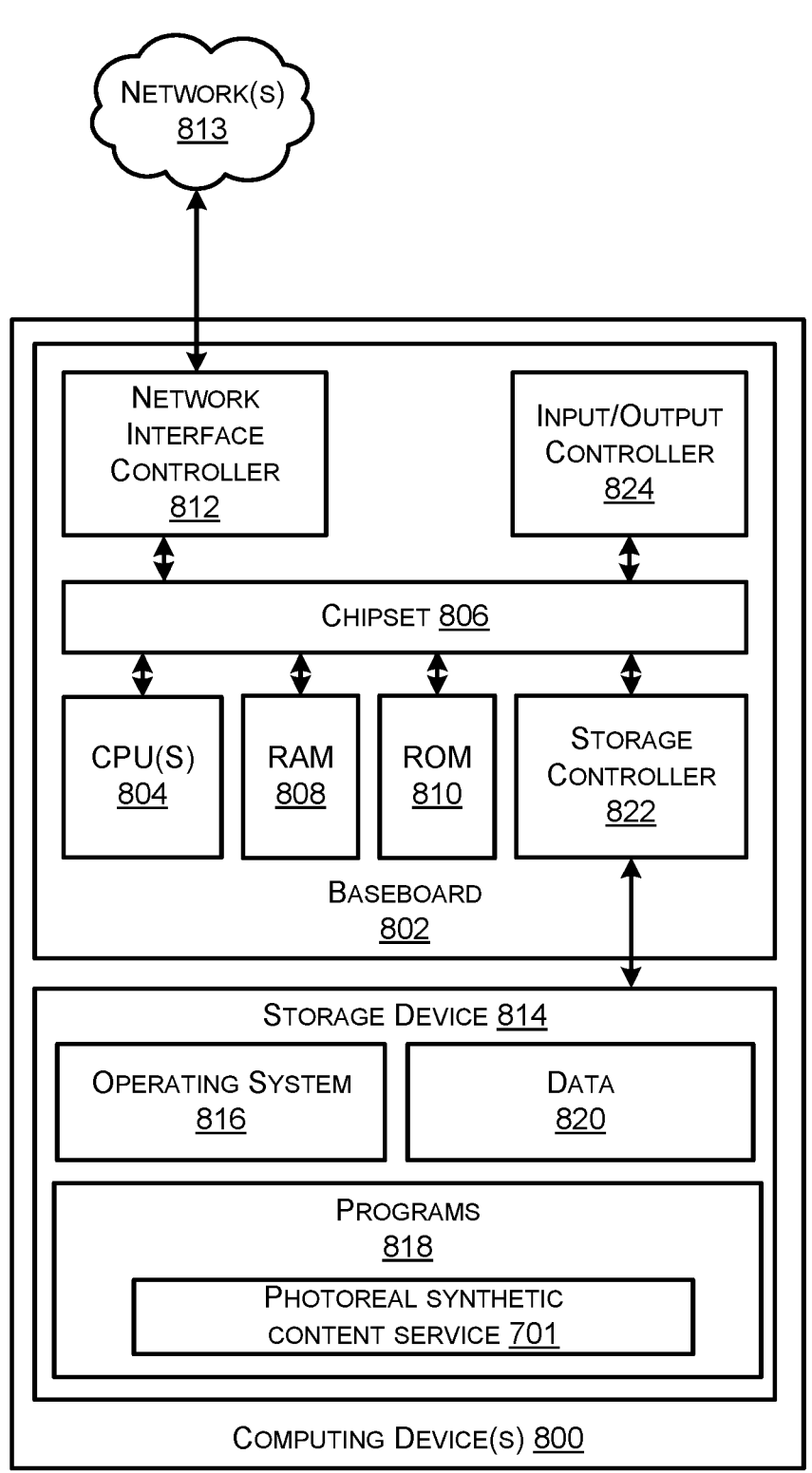
FIG. 8 is a computer architecture diagram showing an illustrative computer architecture for implementing a computing device(s) that can be utilized to implement aspects of the various technologies presented herein.

FIG. 8 shows an example computer architecture for a computing device(s) 800 capable of executing program components for implementing the functionality described above. The computer architecture shown in FIG. 8 may represent a workstation, desktop computer, laptop, tablet, network appliance, smartphone, server computer, or other computing device, and can be utilized to execute any of the software components presented herein. For example, the computing device(s) 800 may represent a server(s) of a data center 700. In another example, the computing device(s) 800 may represent a user computing device, such as the computing device 704.

The computer 800 includes a baseboard 802, which is a printed circuit board (PCB) to which a multitude of components or devices can be connected by way of a system bus or other electrical communication paths. In one illustrative configuration, one or more CPUs 804 operate in conjunction with a chipset 806. The CPUs 804 can be standard programmable processors that perform arithmetic and logical operations necessary for the operation of the computer 800, and the CPUs 804 may be generally referred to herein as a processor(s), such as the processor(s) for implementing the process 600 and/or the process 700, as described above.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may represent the "hardware bus" described above, and it can provide an interface to a random access memory ("RAM") 808, used as the main memory in the computing device(s) 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computing device (s) 800 in accordance with the configurations described herein.

The computing device(s) 800 can operate in a networked environment using logical connections to remote computing devices and computer systems through a network(s) 813, which may be the same as, or similar to, the network(s) 702. The chipset 806 can include functionality for providing network connectivity through a network interface controller (NIC) 812, such as a gigabit Ethernet adapter. The NIC 812 may be capable of connecting the computing device(s) 800 to other computing devices over the network(s) 813. It should be appreciated that multiple NICs 812 can be present in the computing device(s) 800, connecting the computer to other types of networks and remote computer systems.

The computing device(s) 800 can be connected to a mass storage device 814 that provides non-volatile storage for the computer. The mass storage device 816 can store an operating system 816, programs 818, and data 820, to carry out the techniques and operations described in greater detail herein. For example, the programs 818 may include the photoreal synthetic content service 701 to implement the techniques and operations described herein, and the data 820 may include the various model(s) 100, 200, 300 and data 106 used to train the model(s) 100, 200, 300, as well as the media data (e.g., video data) described herein, such as video data corresponding to synthetic content and/or the video content, as described herein. The mass storage device 814 can be connected to the computing device 800 through a storage controller 822 connected to the chipset 806. The mass storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device(s) 800 can store data on the mass storage device 814 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 814 is characterized as primary or secondary storage, and the like.

For example, the computing device(s) 800 can store information to the mass storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device(s) 800 can further read information from the mass storage device 814 by detecting the physical states or characteristics of one or more particular locations within the physical storage units.

In addition to the mass storage device 814 described above, the computing device(s) 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device(s) 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 814 or other computer-readable storage media is encoded with computer-executable instructions which, when loaded into the computing device(s) 800, transform the computer from a general-purpose computing system into a special-purpose computer capable of implementing the configurations described herein. These computer-executable instructions transform the computing device(s) 800 by specifying how the CPUs 804 transition between states, as described above. According to one configuration, the computing device(s) 800 has access to computer-readable storage media storing computer-executable instructions which, when executed by the computing device(s) 800, perform the various processes described above. The computing device(s) 800 can also include computer-readable storage media storing executable instructions for performing any of the other computer-implemented operations described herein.

The computing device(s) 800 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the disclosed techniques and systems in diverse forms thereof.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:

receiving, by one or more processors, input video data generated by a video capture device as the video capture device is capturing a real-world scene, the input video data representing a face of a subject in the real-world scene;

receiving, by the one or more processors, user-provided prompt data representing a voice prompt to make the subject look younger;

generating, by the one or more processors, using one or more trained machine learning models based at least in part on the user-provided prompt data, and using frames of the input video data representing the face of the subject, output data representing a synthetic face of the subject that looks younger than the face of the subject exhibited in the input video data; and causing, by the one or more processors, based at least in part on the output data, video content featuring the synthetic face of the subject overlaid on the face of the subject exhibited in the input video data to be displayed, in real-time as the video capture device is capturing the real-world scene, on a display that is viewable by a user who provided the voice prompt in order to de-age the subject live, while the video capture device is capturing the real-world scene.

2. The method of claim 1, further comprising:

generating, by the one or more processors, output video data corresponding to the video content by overlaying the synthetic face of the subject onto the face of the subject in the input video data, wherein the causing the video content to be displayed on the display is based at least in part on the output video data.

3. The method of claim 1, further comprising:

providing, by the one or more processors, face data representing the face of the subject to the one or more trained machine learning models as additional prompt data, wherein the generating the output data using the one or more trained machine learning models is further based on the additional prompt data.

4. The method of claim 1, wherein:

the user-provided prompt data comprises audio data representing the voice prompt provided by the user and captured by a microphone;

the method further comprises:

generating, by the one or more processors, based at least in part on the audio data, text data representing the voice prompt; and identifying, by the one or more processors, from a list of predefined text prompts, a predefined text prompt that corresponds to the text data; and the generating the output data is based at least in part on the predefined text prompt.

5. The method of claim 1, further comprising:

receiving, by the one or more processors, second user-provided prompt data representing a second prompt provided by the user;

generating, by the one or more processors, using the one or more trained machine learning models based at least in part on the second user-provided prompt data, second output data representing synthetic background content; and causing, by the one or more processors, based at least in part on the output data and the second output data, second video content featuring the synthetic face of the subject and the synthetic background content to be displayed, in real-time as the video capture device is capturing the real-world scene, on the display.

6. A method comprising:

receiving, by one or more processors, input video data generated by a video capture device as the video capture device is capturing a real-world scene, the input video data representing a face of a subject in the real-world scene;

receiving, by the one or more processors, user-provided prompt data representing a prompt to make the subject look younger;

generating, by the one or more processors, using one or more trained machine learning models based at least in part on the user-provided prompt data, and using frames of the input video data representing the face of the subject, output data representing a synthetic face of the subject that looks younger than the face of the subject; and causing, by the one or more processors, based at least in part on the output data, video content featuring the synthetic face of the subject overlaid on the face of the subject exhibited in the input video data to be displayed, in real-time as the video capture device is capturing the real-world scene, on a display that is viewable by a user who provided the prompt.

7. The method of claim 6, wherein the output data is first output data, the synthetic face is a first synthetic face, the video content is first video content, and the method further comprises:

providing, by the one or more processors, as part of a feedback loop, the first output data to the one or more trained machine learning models;

generating, by the one or more processors, using the one or more trained machine learning models based at least in part on the first output data, second output data representing a second synthetic face of the subject that looks younger than the face of the subject; and causing, by the one or more processors, based at least in part on the second output data, second video content featuring the second synthetic face of the subject overlaid on the face of the subject exhibited in the input video data to be displayed, in real-time as the video capture device is capturing the real-world scene, on the display.

8. The method of claim 6, further comprising:

generating, by the one or more processors, output video data corresponding to the video content by overlaying the synthetic face of the subject onto the face of the subject in the input video data, wherein the causing the video content to be displayed on the display is based at least in part on the output video data.

9. The method of claim 5, further comprising:

providing, by the one or more processors, face data representing the face of the subject to the one or more trained machine learning models as additional prompt data, wherein the generating the output data using the one or more trained machine learning models is further based on the additional prompt data.

10. The method of claim 8, wherein:

the output video data comprises a series of frames, and the output data is generated for a subset, but not all, of the series of frames.

11. The method of claim 6, wherein:

the user-provided prompt data comprises audio data representing a voice prompt provided by the user and captured by a microphone;

the method further comprises:

generating, by the one or more processors, based at least in part on the audio data, text data representing the voice prompt; and identifying, by the one or more processors, from a list of predefined text prompts, a predefined text prompt that corresponds to the text data; and the generating the output data is based at least in part on the predefined text prompt.

12. The method of claim 6, further comprising constraining the one or more trained machine learning models to a predefined set of prompts, wherein the prompt provided by the user is a predefined prompt of the predefined set of prompts.

13. The method of claim 6, further comprising:

receiving, by the one or more processors, second user-provided prompt data representing a second prompt provided by the user;

generating, by the one or more processors, using the one or more trained machine learning models based at least in part on the second user-provided prompt data, second output data representing synthetic background content; and causing, by the one or more processors, based at least in part on the output data and the second output data, second video content featuring the synthetic face of the subject and the synthetic background content to be displayed, in real-time as the video capture device is capturing the real-world scene, on the display.

14. A system comprising:

one or more processors; and memory storing computer-executable instructions that, when executed by the one or more processors, cause performance of operations comprising:

receiving input video data generated by a video capture device as the video capture device is capturing a real-world scene, the input video data representing a face of a subject in the real-world scene;

receiving user-provided prompt data representing a prompt to make the subject look younger;

generating, using one or more trained machine learning models based at least in part on the user-provided prompt data, and using frames of the input video data representing the face of the subject, output data representing a synthetic face of the subject that looks younger than the face of the subject; and causing, based at least in part on the output data, video content featuring the synthetic face of the subject overlaid on the face of the subject exhibited in the input video data to be displayed, in real-time as the video capture device is capturing the real-world scene, on a display that is viewable by a user who provided the prompt.

15. The system of claim 14, the operations further comprising:

generating output video data corresponding to the video content by overlaying the synthetic face of the subject onto the face of the subject in the input video data, wherein the causing the video content to be displayed on the display is based at least in part on the output video data.

16. The system of claim 15, wherein:

the output video data comprises a series of frames, and the output data is generated for a subset, but not all, of the series of frames.

17. The system of claim 14, the operations further comprising:

providing face data representing the face of the subject to the one or more trained machine learning models as additional prompt data, wherein the generating the output data using the one or more trained machine learning models is further based on the additional prompt data.

18. The system of claim 14, the operations further comprising constraining the one or more trained machine learning models to a predefined set of prompts, wherein the prompt provided by the user is a predefined prompt of the predefined set of prompts.

19. The system of claim 14, wherein:

the user-provided prompt data comprises audio data representing a voice prompt provided by the user and captured by a microphone;

the operations further comprise:

generating, based at least in part on the audio data, text data representing the voice prompt; and identifying, from a list of predefined text prompts, a predefined text prompt that corresponds to the text data; and the generating the output data is based at least in part on the predefined text prompt.

20. The system of claim 14, wherein the output data is first output data, the synthetic face is a first synthetic face, the video content is first video content, and the operations further comprise:

providing, as part of a feedback loop, the first output data to the one or more trained machine learning models;

generating, using the one or more trained machine learning models based at least in part on the first output data, second output data representing a second synthetic face of the subject that looks younger than the face of the subject; and causing, based at least in part on the second output data, second video content featuring the second synthetic face of the subject overlaid on the face of the subject exhibited in the input video data to be displayed, in real-time as the video capture device is capturing the real-world scene, on the display.

21. The system of claim 14, the operations further comprising:

receiving second user-provided prompt data representing a second prompt provided by the user;

generating, using the one or more trained machine learning models based at least in part on the second user-provided prompt data, second output data representing synthetic background content; and causing, based at least in part on the output data and the second output data, second video content featuring the synthetic face of the subject and the synthetic background content to be displayed, in real-time as the video capture device is capturing the real-world scene, on the display.

* * * * *